US011042064B2

United States Patent
Galstian et al.

(10) Patent No.: US 11,042,064 B2
(45) Date of Patent: Jun. 22, 2021

(54) METHOD OF WAFER SCALE FABRICATION, ASSEMBLY AND ELECTRICAL CONNECTION OF A LIQUID CRYSTAL ELECTRO-OPTIC DEVICE

(71) Applicant: LENSVECTOR INC., San Jose, CA (US)

(72) Inventors: Tigran Galstian, Quebec (CA); Aram Bagramyan, Quebec (CA); Amir Tork, Quebec (CA)

(73) Assignee: Lensvector Inc., San Jose, CA (US)

( * ) Notice: Subject to any disclaimer, the term of this patent is extended or adjusted under 35 U.S.C. 154(b) by 0 days.

(21) Appl. No.: 15/320,457

(22) PCT Filed: Jun. 25, 2015

(86) PCT No.: PCT/CA2015/050589
§ 371 (c)(1),
(2) Date: Dec. 20, 2016

(87) PCT Pub. No.: WO2015/196291
PCT Pub. Date: Dec. 30, 2015

(65) Prior Publication Data
US 2017/0255047 A1    Sep. 7, 2017

Related U.S. Application Data

(60) Provisional application No. 62/016,727, filed on Jun. 25, 2014.

(51) Int. Cl.
*G02F 1/1335* (2006.01)
*G02F 1/1339* (2006.01)
(Continued)

(52) U.S. Cl.
CPC ........ *G02F 1/13394* (2013.01); *G02F 1/1337* (2013.01); *G02F 1/1341* (2013.01);
(Continued)

(58) Field of Classification Search
CPC .......... G02F 1/13394; G02F 1/134309; G02F 1/1341; G02F 1/1337
See application file for complete search history.

(56) References Cited

U.S. PATENT DOCUMENTS 5,870,164 A * 2/1999 Lu .................. G02F 1/1396
349/180
5,963,289 A   10/1999 Stefanov et al.
(Continued)

FOREIGN PATENT DOCUMENTS

CN          2763845        3/2006
CN          102112907 A    6/2011
(Continued)

OTHER PUBLICATIONS

PCT/CA2015/050589 IPRP chapter I, dated Dec. 27, 2016.
(Continued)

*Primary Examiner* — Hoan C Nguyen
(74) *Attorney, Agent, or Firm* — J-TEK Law PLLC; Jeffrey D. Tekanic; Scott T. Wakeman

(57) ABSTRACT

A method of wafer level manufacturing, separating and electrical connection of liquid crystal optical devices is disclosed. An electro-optic device having at least one liquid crystal cell for providing spatially variable control of light is also described. The electro-optic device includes: a pair of opposed substrates, each substrate having a lateral extent; a pair of electrodes for applying an electric field therebetween, each electrode having a pattern and being deposited on a corresponding substrate, each electrode having an electrical contact area extending to at least one side of the corresponding substrate; a pair of alignment layers sandwiching a liquid crystal layer therebetween, the alignment layers defining a predominant orientation direction for liquid crystal molecules of the liquid crystal layer; and a liquid crystal reservoir wall defining a lateral extent of the liquid crystal (Continued)

layer, the liquid crystal reservoir wall being spaced from at least one side of each substrate such that each electrode electrical contact area is exposed to air in an air gap between the substrates.

19 Claims, 25 Drawing Sheets

(51) Int. Cl.
*G02F 1/1341* (2006.01)
*G02F 1/1347* (2006.01)
*G02F 1/1333* (2006.01)
*G02F 1/1337* (2006.01)
*G02F 1/1343* (2006.01)

(52) U.S. Cl.
CPC ...... *G02F 1/1347* (2013.01); *G02F 1/133351* (2013.01); *G02F 1/134309* (2013.01); *G02F 2203/07* (2013.01)

(56) References Cited

U.S. PATENT DOCUMENTS

| | | | | |
|---|---|---|---|---|
| 6,195,149 | B1* | 2/2001 | Kodera | G02F 1/133351 349/187 |
| 6,373,618 | B1* | 4/2002 | Agrawal | G02F 1/1521 359/254 |
| 8,558,985 | B2 | 10/2013 | Nystrom et al. | |
| 8,679,274 | B2 | 3/2014 | Galstian et al. | |
| 2003/0096147 | A1* | 5/2003 | Badding | H01M 8/0271 429/432 |
| 2004/0095631 | A1* | 5/2004 | Poll | E06B 3/66 359/265 |
| 2006/0007550 | A1* | 1/2006 | Tonar | B60R 1/088 359/604 |
| 2007/0195255 | A1* | 8/2007 | Cho | G02F 1/133351 349/153 |
| 2009/0268129 | A1* | 10/2009 | Saeki | G02F 1/1341 349/73 |
| 2009/0323004 | A1* | 12/2009 | Ide | G02F 1/1339 349/143 |
| 2010/0149463 | A1* | 6/2010 | Shimizu | G02F 1/13394 349/106 |
| 2012/0006466 | A1 | 1/2012 | Galstian et al. | |
| 2012/0019761 | A1 | 1/2012 | Nystrom et al. | |
| 2014/0376075 | A1* | 12/2014 | Dubrenat | G02F 1/155 359/271 |

FOREIGN PATENT DOCUMENTS

| | | | |
|---|---|---|---|
| CN | 102369563 A | | 3/2012 |
| FR | 2986625 A1 | | 8/2013 |
| JP | 2000105389 A | * | 4/2000 |
| JP | 2008089775 A | * | 4/2008 |
| JP | 2009237231 A | * | 10/2009 |

OTHER PUBLICATIONS

PCT/CA2015/050589 ISR, dated Dec. 30, 2015.
PCT/CA2015/050589 search strategy, dated Dec. 30, 2015.
Sato, Applications of Liquid Crystals to Variable-Focusing Lenses, Optical Review, Nov. 1999, vol. 6, Issue 6, pp. 471-485.
English translation of the Search Report dated Jan. 19, 2020 in related Chinese application No. CN 2015 800 45107, and translation thereof.
Office Action from the Chinese Patent Office dated Feb. 3, 2020 in related Chinese application No. CN 2015 800 45107, and translation thereof.
Office Action from the Chinese Patent Office dispatched Dec. 31, 2020 in related Chinese application No. CN 201580045107.0, and translation thereof.

* cited by examiner

Separate unit with "exposed" electrode surfaces 6 (left) and 5 (right)

Soft solderable contacts (16)

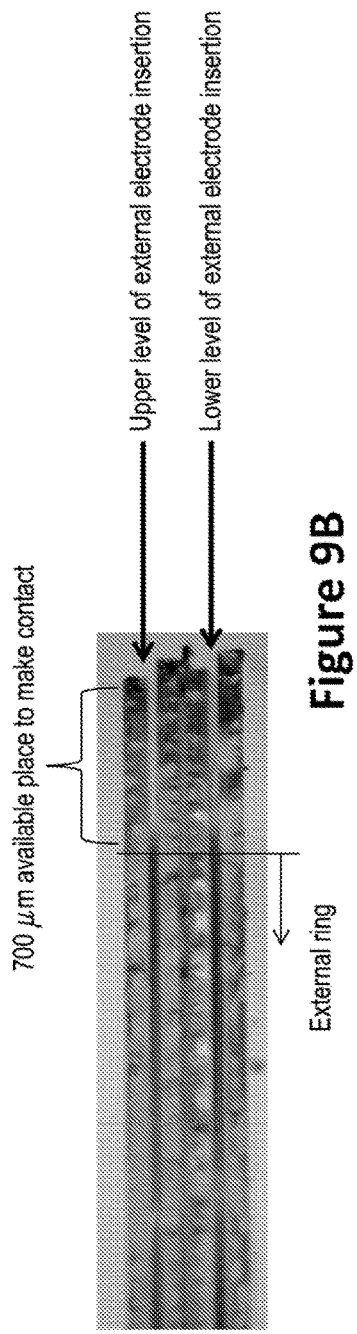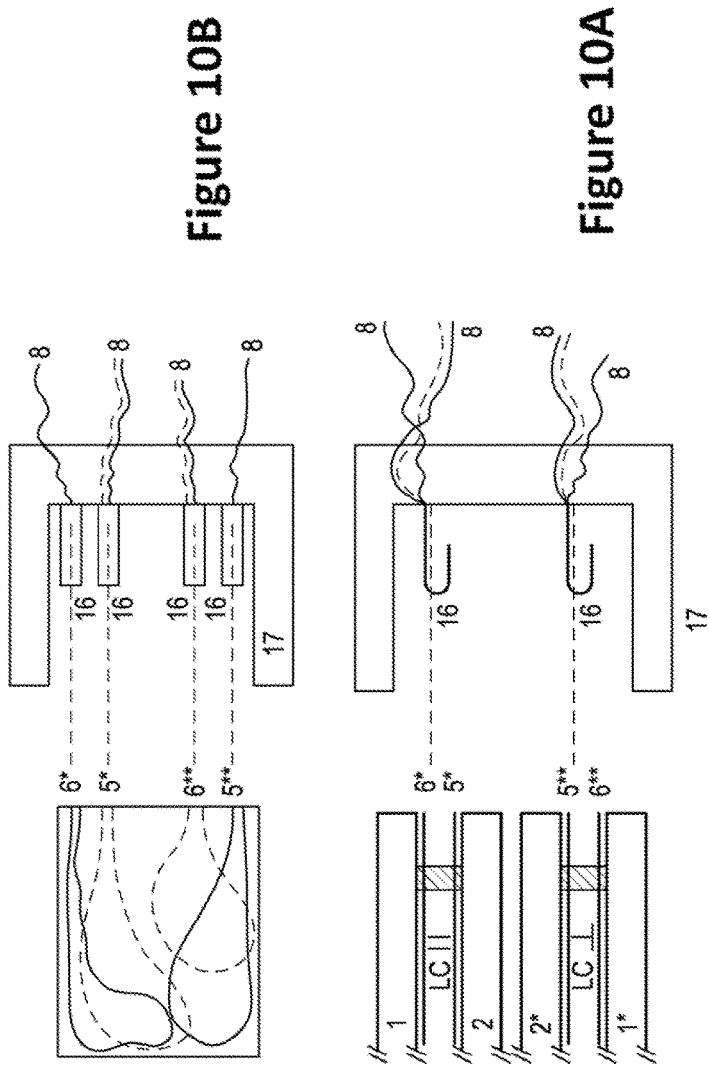

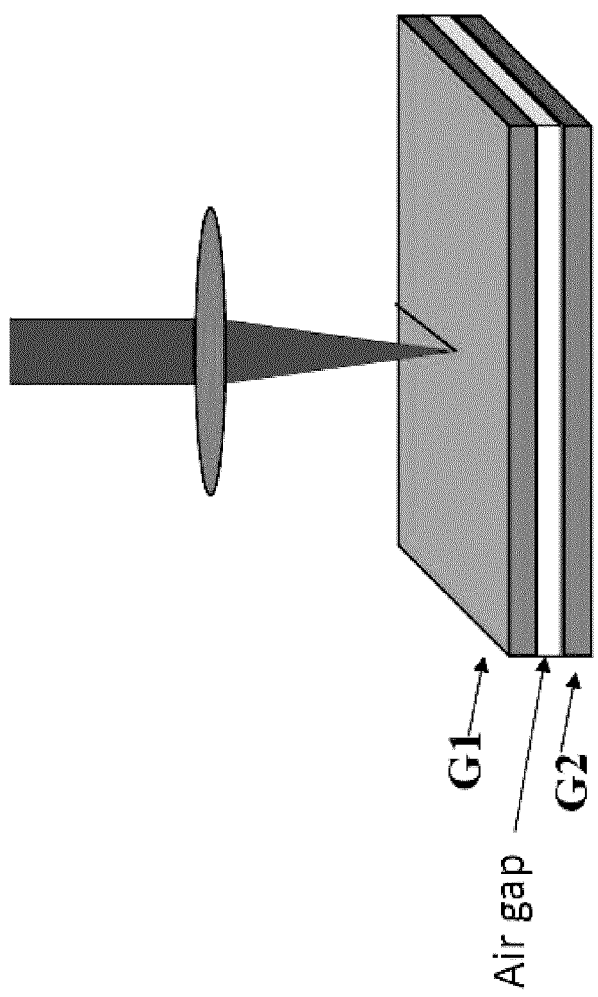
Figure 13A
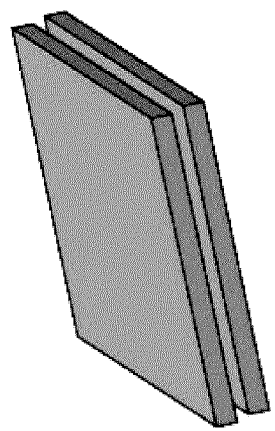
After cleaving
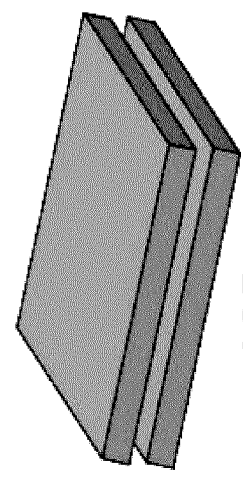
Figure 13B

METHOD OF WAFER SCALE FABRICATION, ASSEMBLY AND ELECTRICAL CONNECTION OF A LIQUID CRYSTAL ELECTRO-OPTIC DEVICE

This application claims priority of U.S. Provisional Application No. 62/016,727 filed Jun. 25, 2014.

TECHNICAL FIELD

This invention relates to liquid crystal electro-optic devices, and in particular to fabrication, mechanical assembly and electrical connection of liquid crystal electro-optic devices.

BACKGROUND

Liquid Crystal (LC) displays (LCD) and lenses (LCL) are known in the art. For example a review of such liquid crystal optical devices is provided by S. Sato entitled "Applications of Liquid Crystals to Variable-Focusing Lenses" in OPTICAL REVIEW Vol. 6, No. 6 (1999) 471-485. The fabrication, assembly and electrical connection of LCL optical devices are critical for commercial scale manufacture of consumer electronic devices employing LCLs such as, but not limited to: cameras in phones, tablets, etc. These devices are very sensitive to manufacturing costs. For this reason wafer scale (parallel or arrayed) fabrication methods have been developed for LCLs, for example described in U.S. Pat. No. 8,679,274 entitled "Method of Manufacturing a Liquid Crystal Device", which is incorporated herein by reference.

Wafer level manufacturing is relatively common. Integrated circuits, image sensors, micro lens arrays, etc. are presently manufactured in wafer form. Such parallel wafer level manufacturing uses a limited number of process steps to simultaneously obtain thousands of such devices, reducing their manufacturing cost dramatically. However, the separation of such arrayed wafer level manufactured LCL devices into individual devices (also referred to generally as dies), their assembly and their electrical connection remain some of the most challenging manufacturing steps. Tailored approaches must be developed for each specific application.

Conventional integrated circuit wafers are usually "all-solid", have a surface mounting and have a reflowable electrical connection design. The first, all-solid, feature allows the use of mechanical dicing (among other techniques) to separate each integrated circuit die from the wafer. Mechanical dicing is a cost effective and a widely accepted technique in the wafer scale semiconductor manufacturing industry. The third, reflowable electrical connectivity, feature allows standard assembly and electrical connection.

In the case of LCL optical devices, the need for a very low cost manufacturing process restricts available options to the use of simple glass, ceramic or polymer wafer substrates, which do not permit reflowable electrical connection typically used for integrated circuits.

SUMMARY

The manufacturing of LCL optical devices is more complicated than the manufacturing of all-solid integrated circuits considering that the LCL wafers 12 are 2D arrays of thousands of LCL optical devices 11, which, by the liquid nature of the LC layers employed, necessarily contain numerous liquid reservoirs 22 as shown in FIG. 1. For example, as shown in FIG. 2A each LCL optical device 11 includes substrates 1, 2, and at least one LC reservoir 22 delimited by an adhesive ring 3 and spacers 23. Alternatively or in addition the LC reservoirs 22 can also be fabricated using a substrate 2 (glass, polymer, etc.) having depressions for the LC reservoirs 22.

To simplify the description herein, because the LC material 4 is birefringent, FIG. 2A illustrates a polarization dependent LCL optical device 11. At least two such LCL optical devices 11, stacked and cross-oriented (see FIG. 4), are required to provide polarization independent LCL optical devices 11 for operation in ambient (lamp, Sun) light. Stacked LCL optical devices 11 require an increased number of substrates to be cut through in singulating each individual polarization independent LCL optical device 11.

Taking connectivity into consideration, FIG. 2B illustrates a prior art polarization dependent LCL optical device 11 including top 6 and bottom 5 transparent electrodes, for example made of Indium Tin Oxide (ITO), coated on respective substrates 1 and 2. The resulting cleaved substrates are spatially shifted to provide side edges where the transparent electrodes 5, 6 are exposed to allow electrical connectivity 8 by "top" soldering 7. Specifically, the dicing of such individual LCL optical devices 11 requires shifted scribe lines on different substrates. FIG. 2C is a Scanning Electron Microscope (SEM) image showing a perspective view of a scribed LCL array. FIG. 2D is a SEM image of cleaved substrates with a 133 μm shift between the top and bottom substrates 1, 2.

FIG. 3A shows another prior art attempt in accordance with which the external space between rings 3 of individual devices 11 is typically filled with a back-fill liquid material 10 that is subsequently solidified (for example polymerized). In this way, mechanical dicing may be used to cut through multiple substrates 1, 2 and through the solidified back-fill material 10 between rings 3.

For example the back-fill material can be injected during wafer level assembly of liquid crystal lens devices as described in U.S. Pat. No. 8,679,274 entitled "Method of Manufacturing a Liquid Crystal Device" claiming priority from Dec. 31, 2008, which is incorporated herein by reference. For example, once a wafer 12 of LCL optical devices 11 is assembled, the interstitial space (or extracellular matrix) between the reservoir walls 3 (outside reservoirs 22) is flooded with back-fill material by pumping back-fill material from the bottom of a vertically held wafer 12 or absorbed by capillary action to reduce air pockets. As another, example an additional peripheral adhesive wall (outer wall) is provided outside and around the array of LCL optical devices 11 on wafer 12, the peripheral adhesive wall is "U"-shaped having an opening. With the entire wafer 12 exposed to vacuum, the opening of the peripheral adhesive wall is dipped into back-fill material. Removing the vacuum results in back-fill material being absorbed into the interstitial space (capillary action). The back-fill material is then cured before the wafer 12 is processed through dicing.

It is apparent that the prior art solution shown in FIG. 3A does not take connectivity into consideration. FIG. 3B schematically illustrates a side view of a polarization dependent LCL optical device 11 in a wafer 12 of multiple such devices. LCL optical device 11 includes top 6 and bottom 5 transparent electrodes extending outside of the liquid crystal reservoirs 22 to dicing lines 9 in interstitial regions back-filled with hard(ened) material 10 which provides support for mechanical dicing. FIG. 3C shows a side view of a singulated polarization dependent LCL optical device die 11 with edge exposed electrodes 6 on the left and 5 on the right.

In accordance with a prior art approach shown in FIG. 3D, conductive adhesive 13 is used to provide edge contact with electrodes 5 and 6. External wires 8 are connected to electrodes 5 and 6 respectively via the conductive adhesive 13. Unfortunately the use of the contact adhesive 13 is not reliable and the curing process required is complex, particularly in the presence of liquid crystal material 4 within the liquid crystal reservoirs 22.

In accordance with another prior art approach shown schematically in FIG. 3E, additional conductive coatings 14 are deposited post-dicing, on an individual die basis, to enable "surface or top" soldering of external wires 8 instead of "edge" contacts as shown in FIG. 3F. Unfortunately the deposition of additional conductive coating 14 to each LCL die 11 for providing surface soldering 7 is complex and costly.

Similar or alternative approaches must be used in other wafer level manufacturing processes where the entire wafer is not all solid.

In this LCL manufacturing context, a specific "edge-connect" approach was developed by LensVector and described in U.S. Pat. No. 8,558,985 claiming priority from U.S. Provisional Application 61/059,274 filed Jun. 6, 2008, patent which is incorporated herein by reference, where various electrodes deposited on different horizontal substrates are provided on their respective substrates with horizontal extensions to the dicing lines as illustrated in FIG. 4. It is noted that FIG. 4 illustrates a polarization independent liquid crystal optical device (so called "full" lens). A relatively thick electrically conductive zone (conductive adhesive, thick metal, etc.) is deposited on the dicing line.

In this way, a large conductive area is exposed on edge after the dicing process. This conductive area, many times the layer edge area of an electrode layer, can be used to ensure good electrical connectivity via the deposition of a local "droplet" of a conductive adhesive on the edge of the die, near to the conductive area. While this technique is functional, it requires specific conductive adhesives and processes which are not standard in the wafer manufacture industry.

In view of the above described state of the art, a need exists to develop an alternative way of wafer scale manufacturing of LCL optical devices which would allow simpler assembly and more convenient electrical connectivity processes.

Therefore there is proposed a method of wafer level manufacturing with steps which enable obtaining surface exposed electrical connection zones in contrast to the edge connection developed and used so far. Assembly and electrical connection techniques are disclosed which use "horizontal" exposed surfaces.

BRIEF DESCRIPTION OF THE DRAWINGS

The invention can be better understood by way of the following detailed description of embodiments of the proposed solution with reference to the appended drawings, in which:

FIG. 9B is an illustration showing a side view of a cleaved polarization independent LCL optical device in accordance with the proposed solution;

FIG. 10A is a schematic diagram illustrating a side sectional view of a lead frame or housing providing electrical connectivity for a polarization independent LCL optical device in accordance with the proposed solution;

FIG. 10B is a schematic diagram illustrating a top view of patterned electrodes on different substrates and a corresponding lead frame or housing providing electrical connectivity for a polarization independent LCL optical device in accordance with the proposed solution;

FIG. 13A is a schematic diagram illustrating a perspective view of a wafer laser cutting process in accordance with another embodiment of the proposed solution;

FIG. 13B is a schematic diagram illustrating a perspective view of cleaved electro-optical dice in accordance with the proposed solution;

DETAILED DESCRIPTION

The above mentioned electrical connectivity problems can be solved according to the proposed solution for example as described below.

Figure 1:
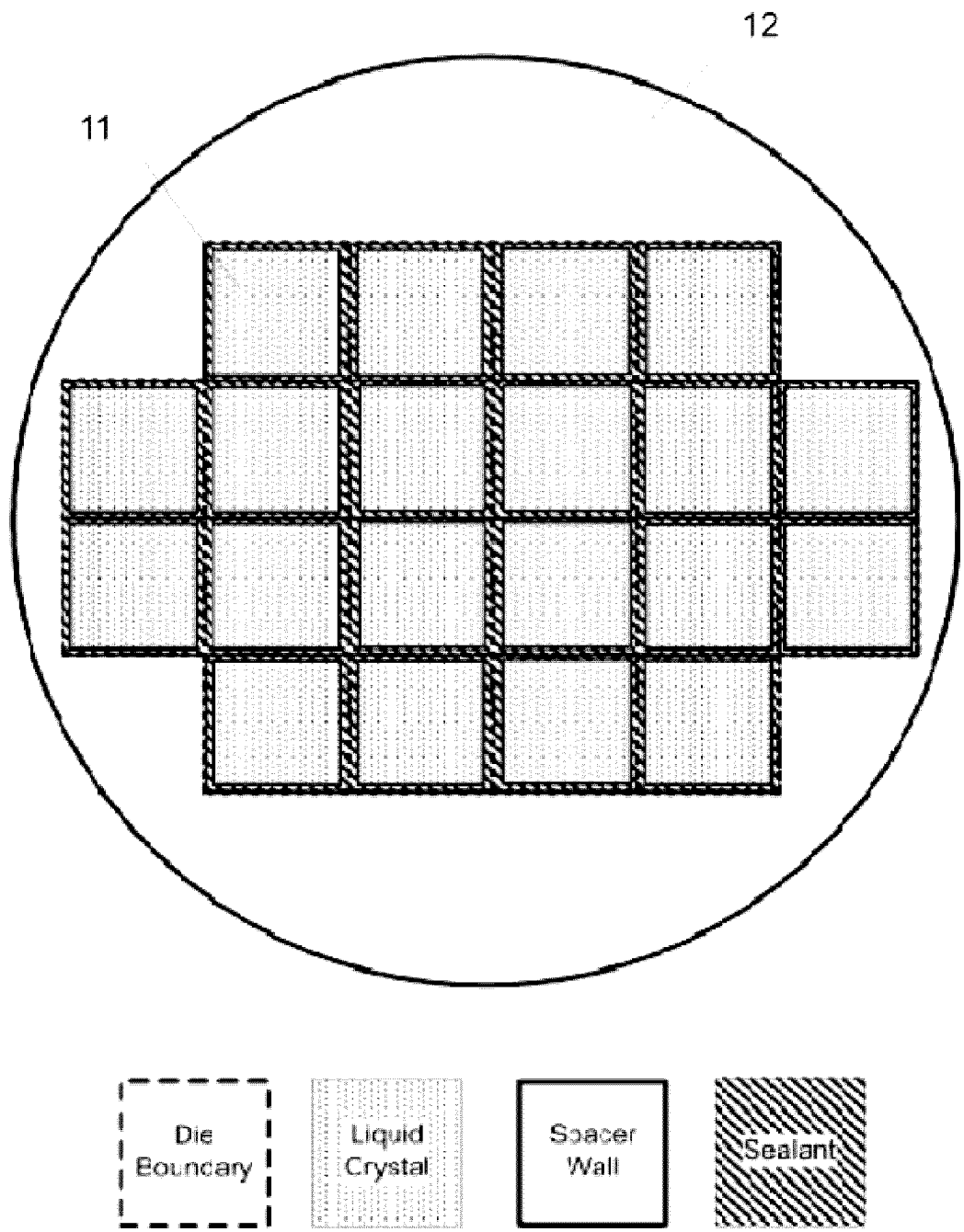
FIG. 1 is a schematic diagram showing top view of a prior art wafer of liquid crystal optical devices during manufacture just prior to dicing.
Figure 2A:
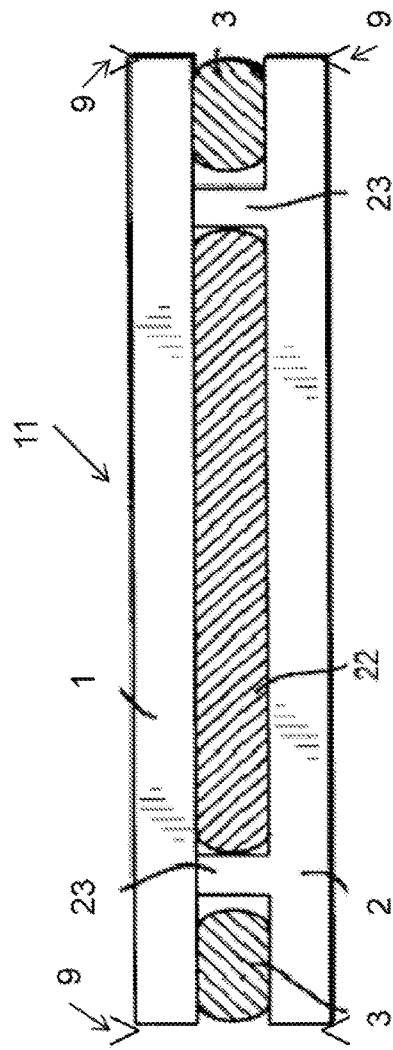
FIG. 2A is a schematic diagram showing a cross-sectional view through a diced prior art wafer level manufactured liquid crystal optical device having a liquid crystal filled reservoir.
Figure 2B:
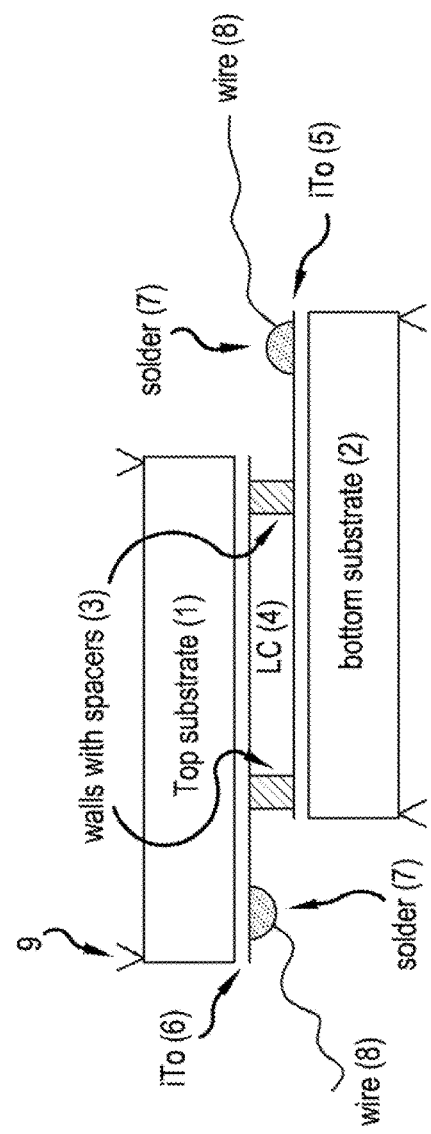
FIG. 2B is another schematic diagram showing a cross-sectional view through a diced prior art waver level manufactured liquid crystal optical device having overhanging substrates exposing electrode layers for external soldering.
Figure 2C:
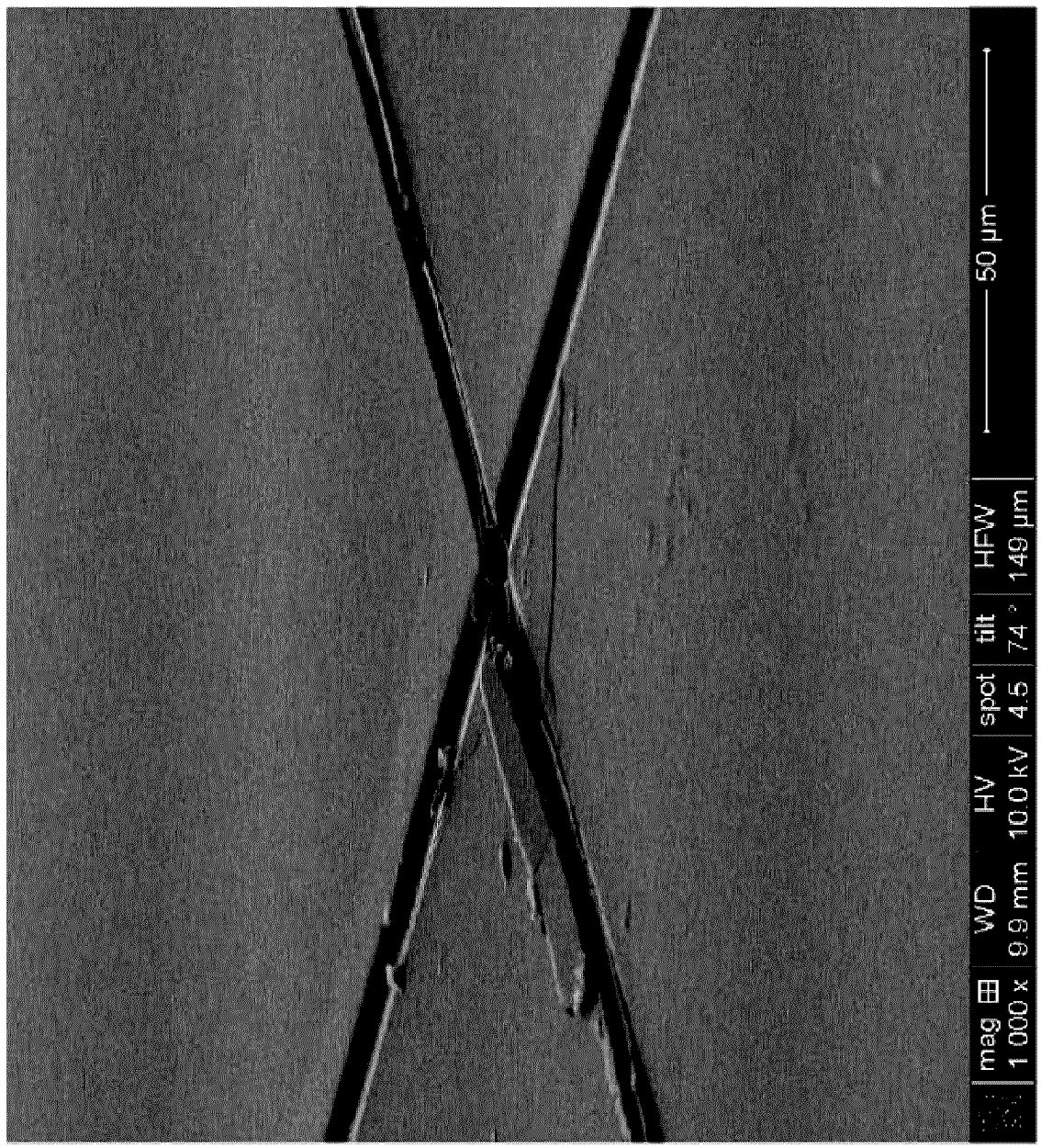
FIG. 2C is a perspective view illustrating a scanning electron microscope image showing a diamond scribed wafer as shown in FIG. 1.
Figure 2D:
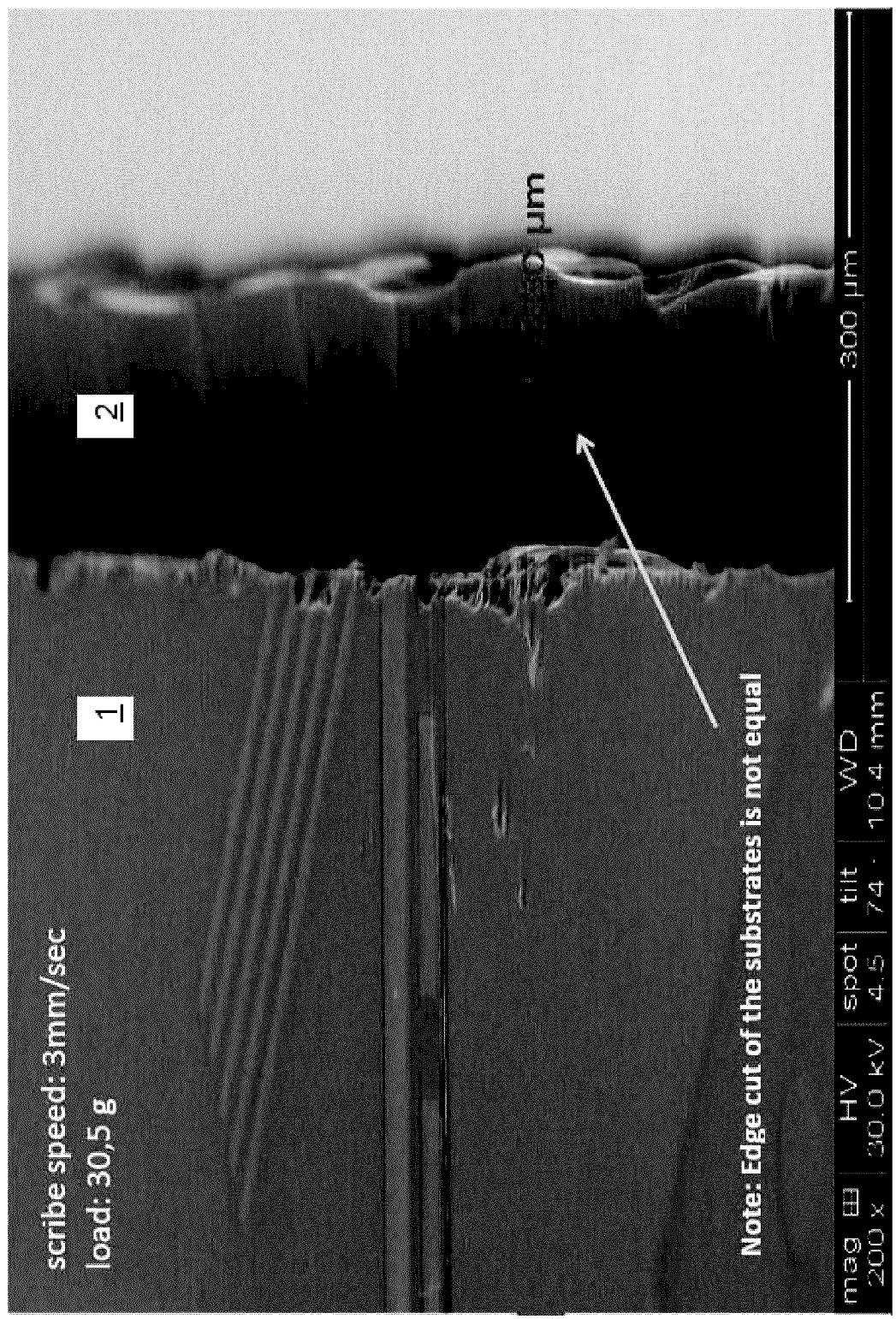
FIG. 2D is a perspective view illustrating a scanning electron microscope image showing spatially shifted cleaved substrates as shown in FIG. 2B.
Figure 3A:
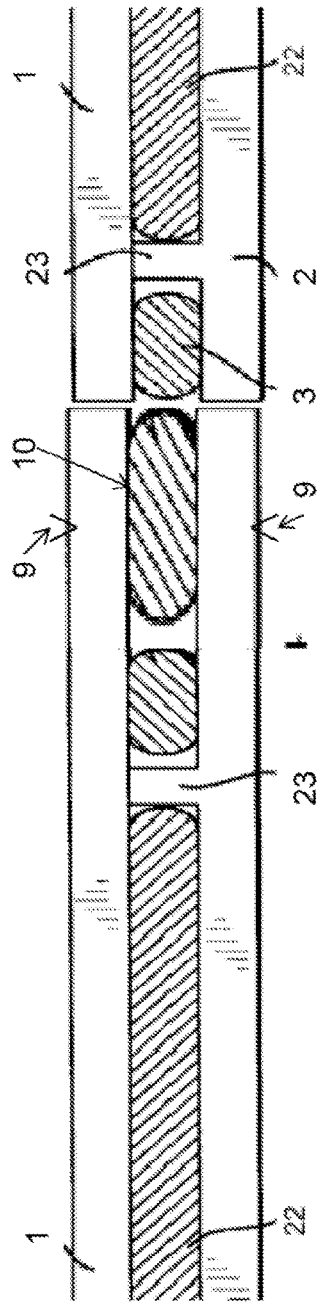
FIG. 3A is a schematic diagram showing general a prior art wafer of liquid crystal lens devices surrounded by backfill material.
Figure 3B:
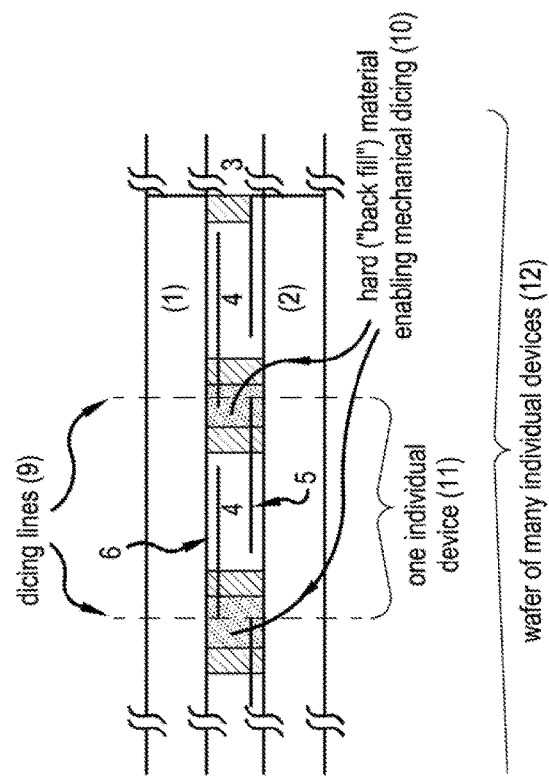
FIG. 3B is a schematic diagram illustrating a side view of a prior art wafer of liquid crystal lens devices surrounded by backfill material, each liquid crystal lens device having non-uniform electrodes extending to dicing lines.
Figure 3C:
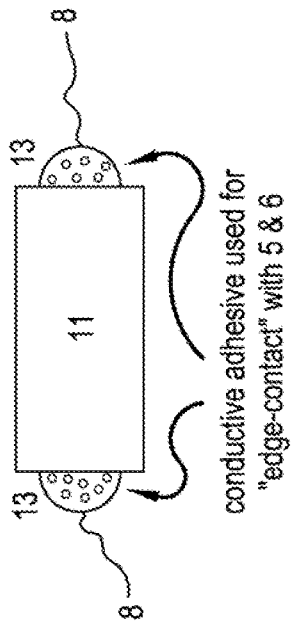
FIG. 3C is a schematic diagram illustrating a singulated liquid crystal lens device from a wafer illustrated in FIG. 3B.
Figure 3D:
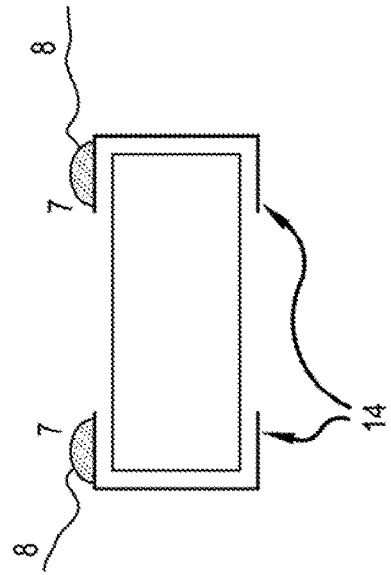
FIG. 3D is a schematic diagram illustrating external electrical edge connection to electrodes of the liquid crystal lens device illustrated in FIGS. 3B and 3C.
Figure 3E:
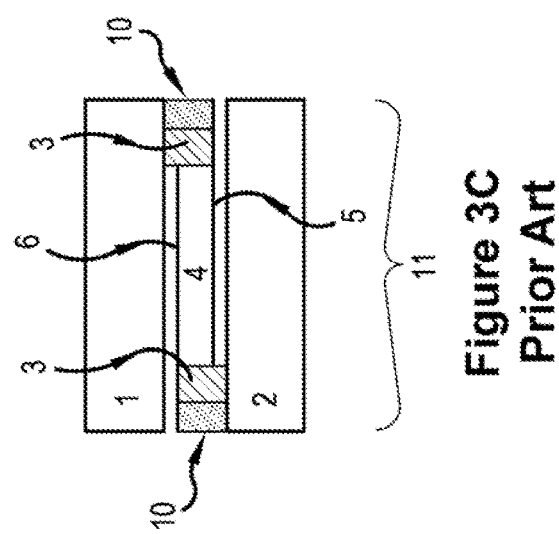
FIG. 3E is a schematic diagram illustrating prior art use of conductive coatings for external electrical edge connection.
Figure 3F:
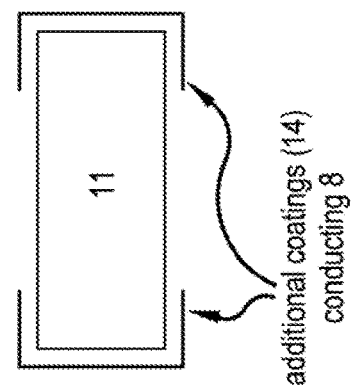
FIG. 3F is a schematic diagram illustrating external electrical edge connection to electrodes of the liquid crystal lens device illustrated in FIG. 3E.
Figure 4:
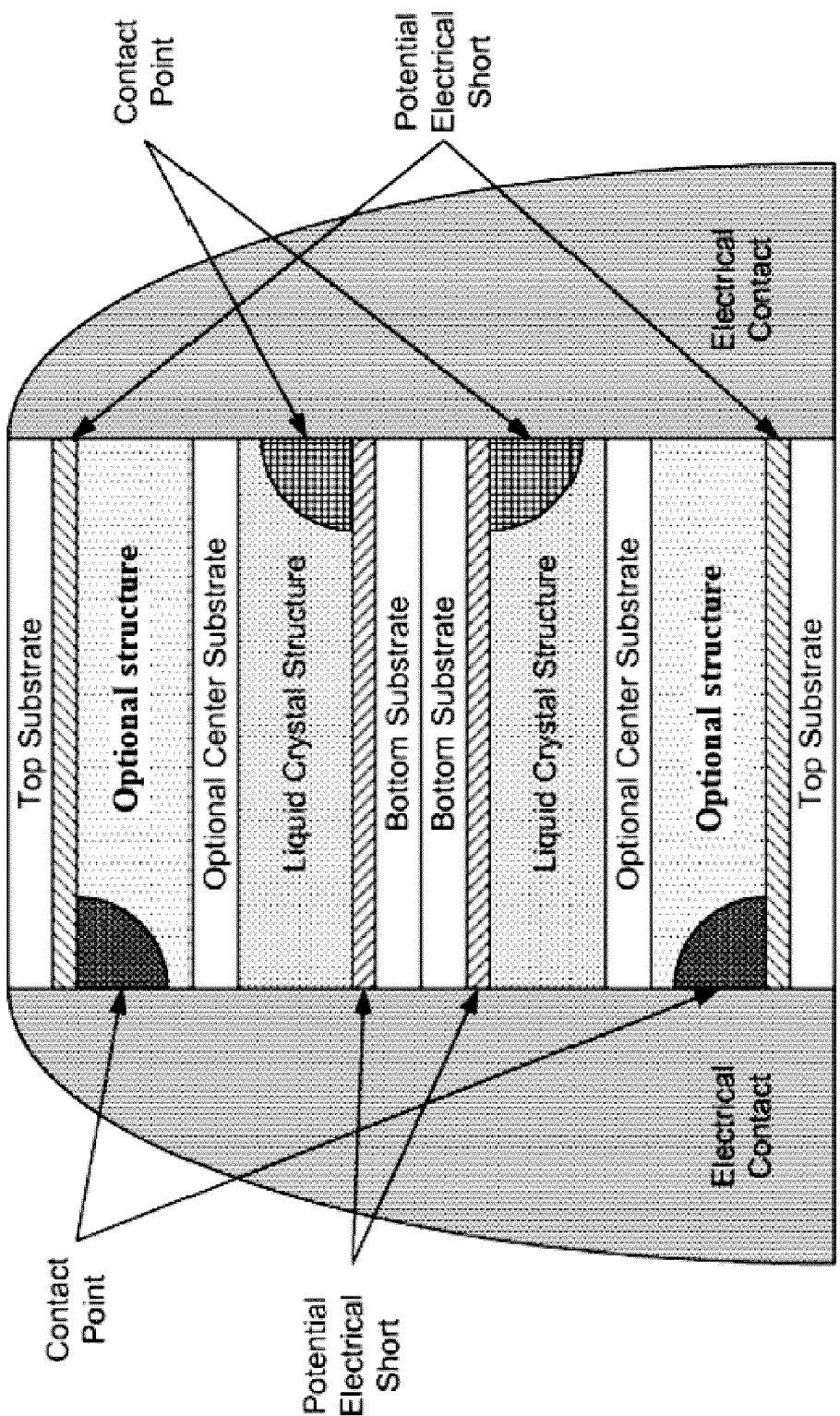
FIG. 4 is another schematic diagram showing another prior art polarization independent liquid crystal lens using another electrical edge connectivity technique.
Figure 5A:
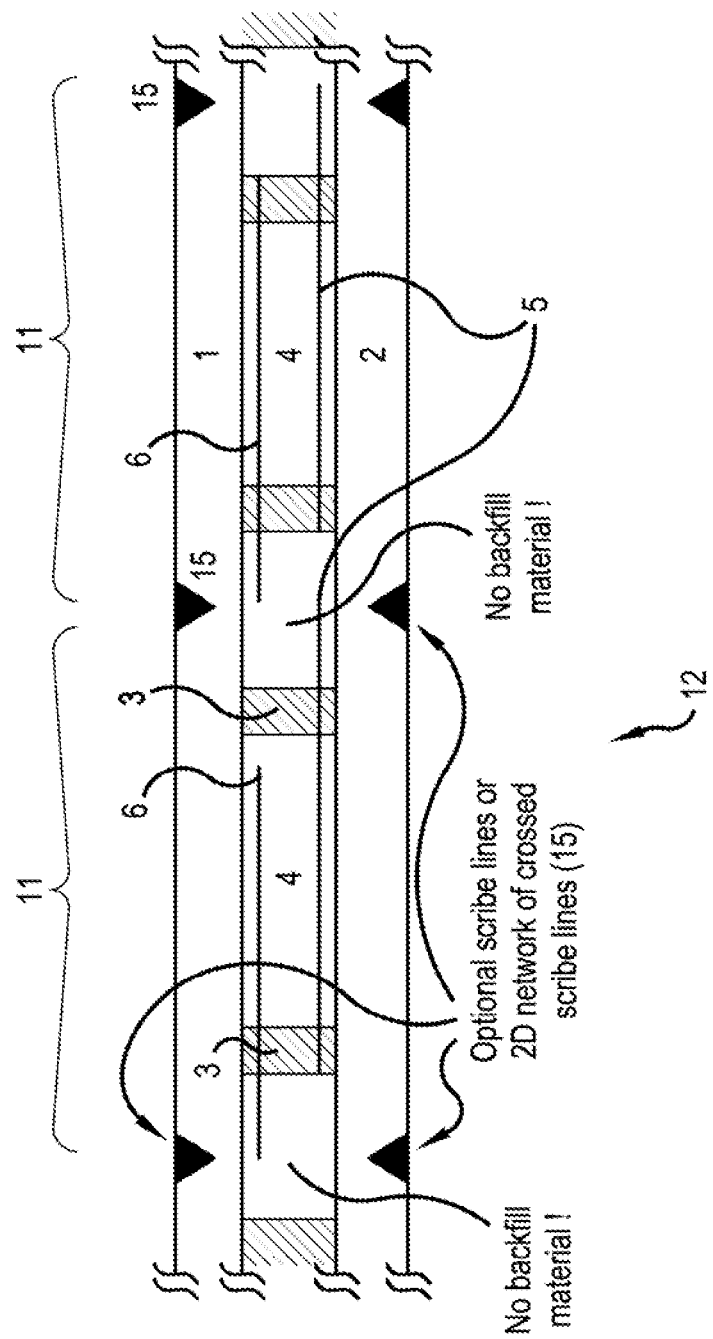
FIG. 5A is a schematic diagram illustrating a wafer of polarization dependent LCL devices manufactured without back-fill material between individual LCL devices on the wafer, in accordance with an embodiment of the proposed solution.
Figure 5B:
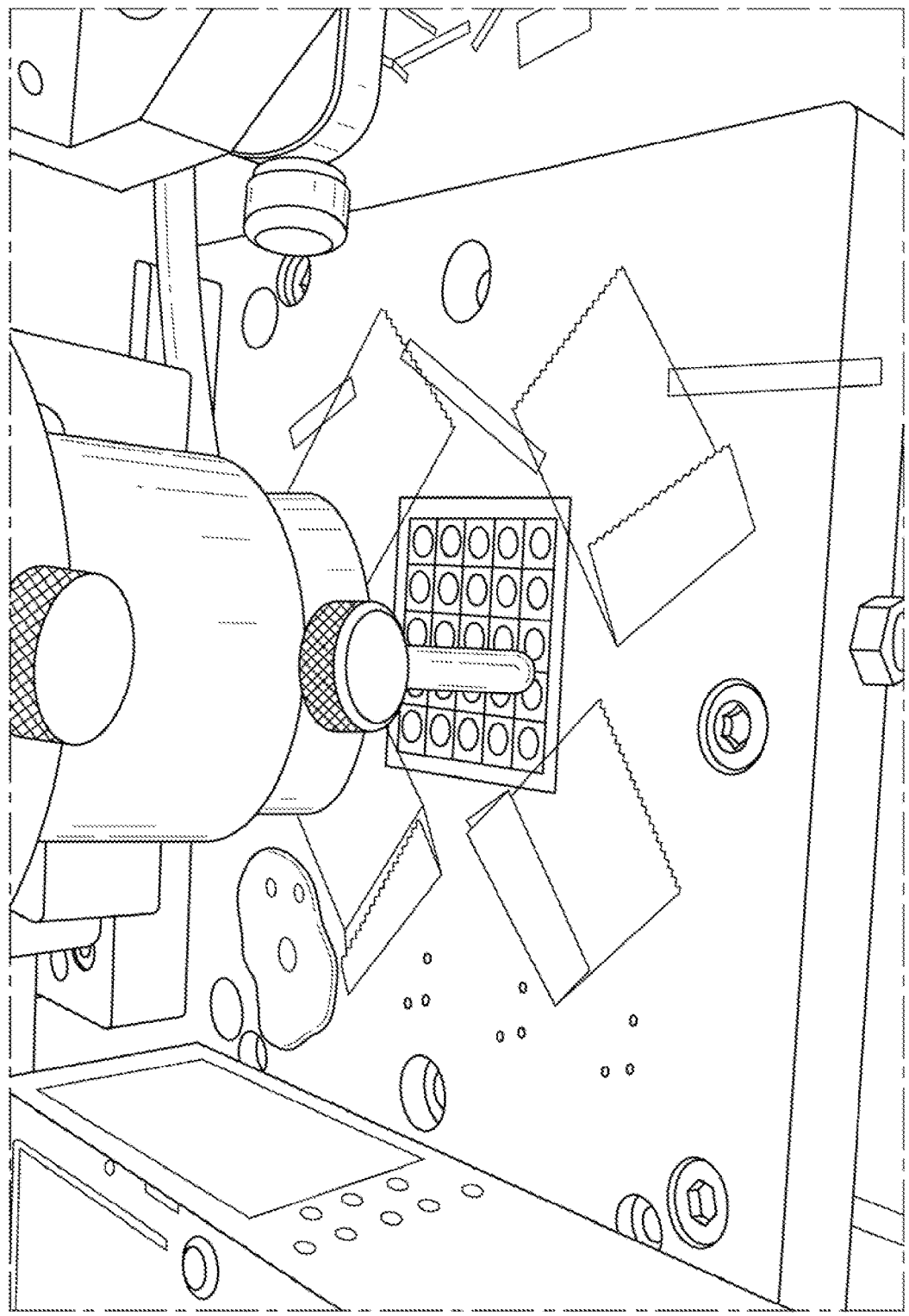
FIG. 5B is an illustration of a mechanical scribe tool employed in scribing a wafer of LCL devices.
Figure 5C:
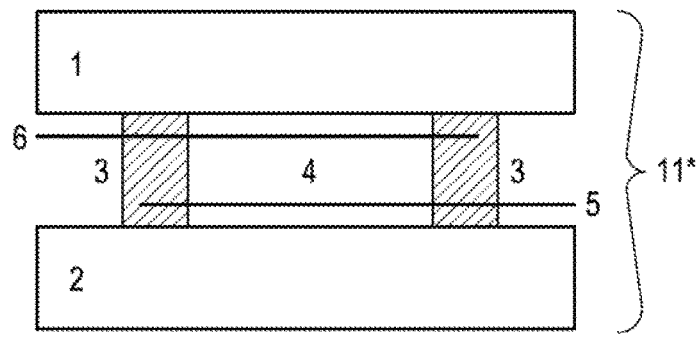
FIG. 5C is a schematic diagram illustrating an individual polarization dependent LCL device manufactured without back-fill material around the corresponding LC reservoir, in accordance with the proposed solution.
Figure 6:
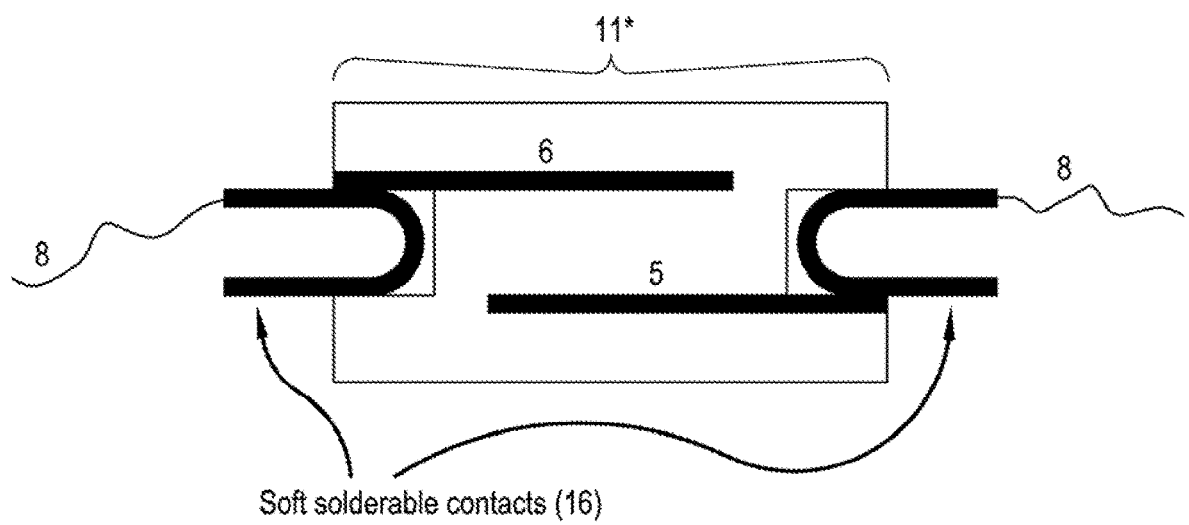
FIG. 6 is a schematic diagram illustrating, in cross-section, providing electrical connectivity via soft leads inserted in side air gaps in contact with electrode layers in accordance with the proposed solution.

In accordance with a first embodiment schematically illustrated in FIG. 5A, a manufacturing process for polarization dependent LCL electro-optic device 11 arrays on a wafer 12 is followed; however the step of back-fill material injection is omitted (this is also referred to as "no-backfill material"). In this case, thousands of LCL electro-optic devices 11 are obtained on the same wafer 12, each having corresponding reservoir walls 3 (separating neighboring reservoirs 22) which are separated by air space instead of solid back-fill material. A mechanical scribe tool for example illustrated in FIG. 5B is employed to scribe (15) both sides of the wafer 12 illustrated in FIG. 5A along scribe lines 15 which form a 2D network of scribe lines, for example as illustrated in FIG. 2C. Individual polarization dependent LCL electro-optic devices 11 cleaved out of the wafer are schematically illustrated in FIG. 5C with separate electrode 5, 6 surfaces exposed inside air gaps between substrates 1, 2 alongside corresponding reservoir 22. For example, the air gap between two substrates can be 3 µm to 100 µm and the distance between the border of the substrates and the reservoir wall 3 can be 500 µm to 700 µm deep. FIG. 6 schematically illustrates, in cross-section, the use of soft solderable contacts or leads 16 inserted (and expanded) into the side air gaps to provide external electrical connectivity (8).

Figure 7C:
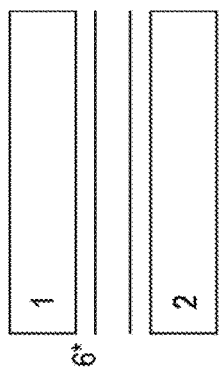
FIG. 7C is a schematic diagram illustrating in cross-section transparent electrode layers extending to the same side of an LCL optical device die in accordance with the proposed solution.
Figure 7A:
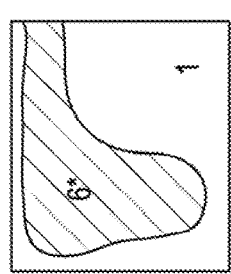
FIGS. 7A and 7B are schematic diagrams illustrating patterned transparent electrode layers deposited on corresponding substrates in accordance with the proposed solution.
Figure 7B:
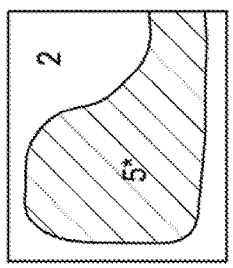
Figure 8A:
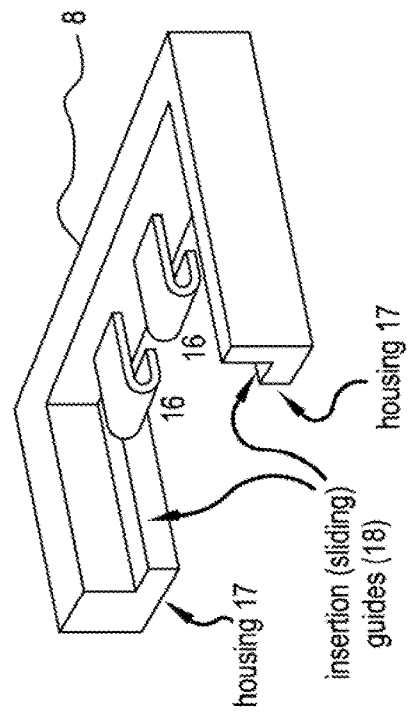
FIG. 8A is a schematic diagram illustrating a lead frame providing electrical connectivity for an individual LCL optical device illustrated in FIG. 7C in accordance with the proposed solution.
Figure 8B:
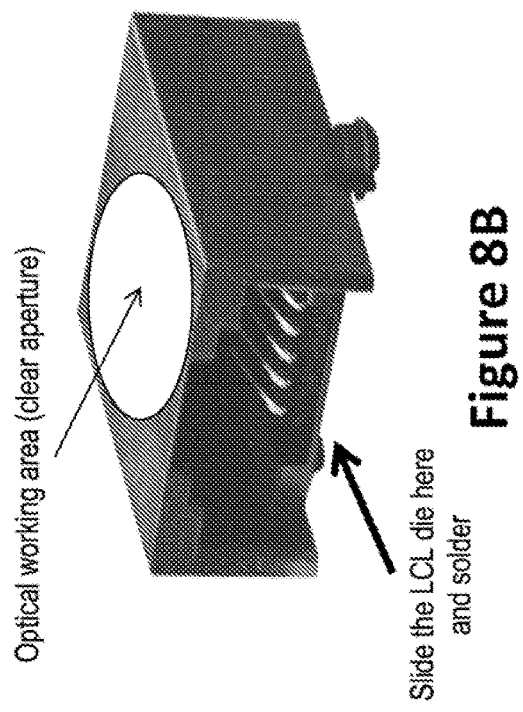
FIG. 8B is a schematic diagram a housing providing electrical connectivity for an individual LCL optical device illustrated in FIG. 7C in accordance with another implementation of the proposed solution.

For certainty, the invention is not limited to employing electrical contact leads 16 on multiple sides of a LCL electro-optic device die 11. FIG. 7A schematically illustrates a plan view of a patterned top transparent electrode 6 extending to the back right on the substrate 1, whereas FIG. 7B schematically illustrates a plan view of a patterned bottom transparent electrode 5 extending to the front right on the substrate 2. The electrode layers can be differently patterned while all electrode layers have electrically conductive area extensions which extend to one side of the die 11. As illustrated in cross-section in FIG. 7C, the assembled LCL electro-optic device die 11 includes top 6 and bottom 5 transparent electrodes extending to the right edge of the LCL electro-optic device die 11 without using back-fill material between substrates 1, 2. A lead frame 17 is illustrated in FIG. 8A having one sided leads 16. The LCL optical device die 11 of FIG. 7C can be inserted (slid) into the lead frame 17 employing insertion (sliding) guides 18. The invention is not limited to employing lead frames, an optical device housing having an aperture as illustrated in FIG. 8B can equally be employed to provide electrical connectivity in accordance with another implementation of the proposed solution. The same lead frame 17 or housing can also be employed to provide precise positioning of the electro-optic device within the overall apparatus (for example for positioning a LCL optical device within a camera).

Figure 9A:
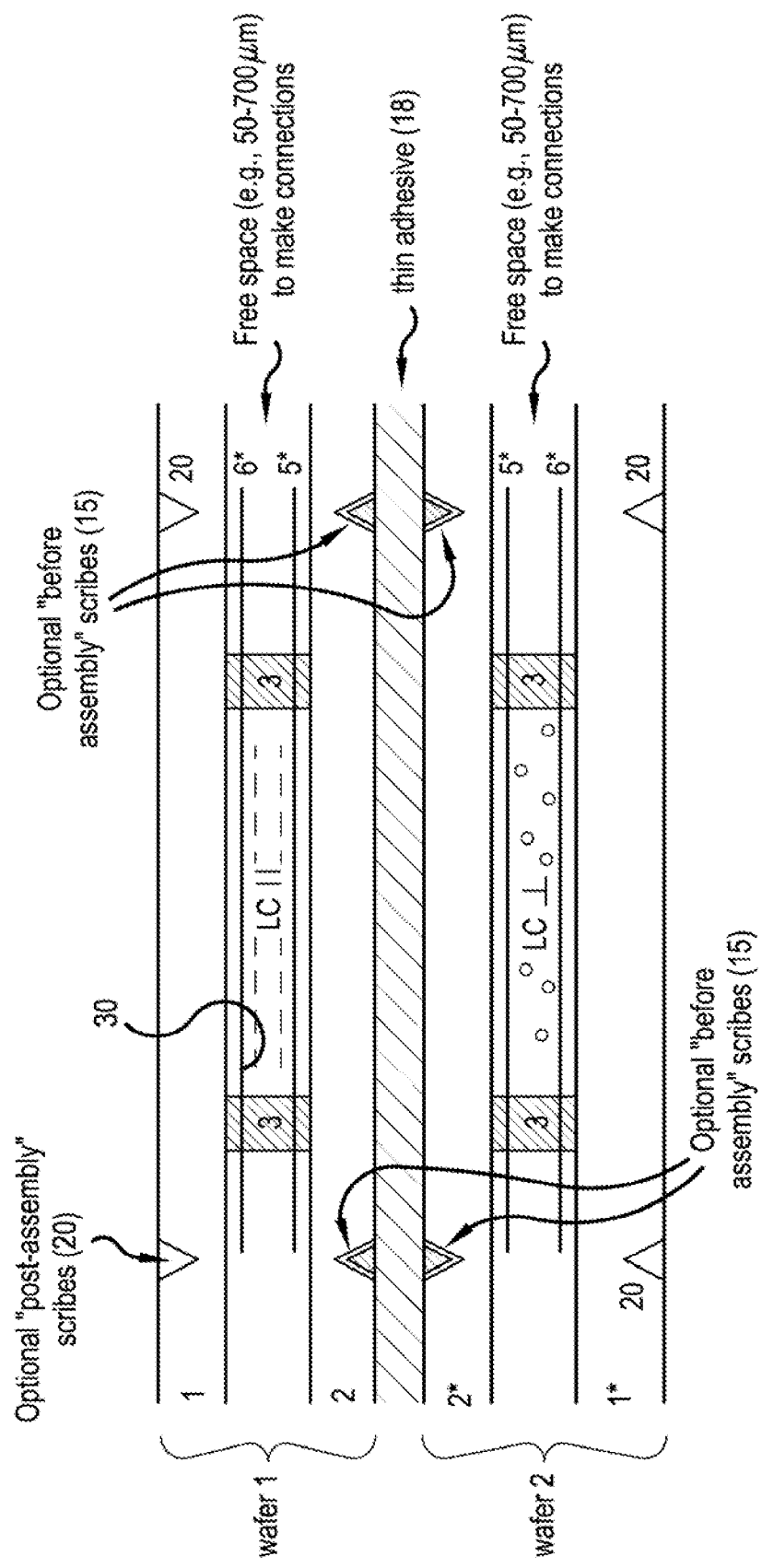
FIG. 9A is a schematic diagram illustrating a side sectional view of a polarization independent LCL optical device in a wafer of such devices in accordance with the proposed solution.

The invention is not limited to the above mentioned solution wherein electrical connectivity is provided for a polarization dependent LCL electro-optic device. FIG. 9 schematically illustrates a layered structure of a wafer level manufactured polarization independent LCL electro-optic device within an array thereof. Two wafers having arrays of polarization dependent LCL electro-optic devices 11 are assembled together in a stack for example by means of a thin layer of adhesive 19 using cross oriented liquid crystal layers $LC_\parallel$ and $LC_\perp$ to act on to perpendicular polarizations of incident light. In accordance with the embodiment of the proposed solution, prior to assembly, the inner bottom substrates 2, 2* of each polarization dependent LCL electro-optic device wafer 12 are scribed 15. The two external top substrates 1 can be scribed 20 after assembly. The entire assembled layered structure can be cleaved into individual polarization independent LCL electro-optic devices 11. FIG. 9B illustrates a cleaved polarization independent LCL electro-optic device showing stacked side air gaps corresponding to each liquid crystal layer 4. For example, the air gaps have a clearance of about 40 µm and are about 700 µm deep.

Figure 9C:
FIG. 9C is an illustration showing a perspective SEM view of a cleaved polarization independent LCL optical device in accordance with the proposed solution.

FIG. 9C illustrates an SEM image showing a perspective view of a cleaved polarization independent LCL electro-optic device 11.

Schematically illustrated in FIG. 10A is a side view of a mechanical housing or lead frame 17 including specific lead electrodes 16 at multiple levels which can be inserted into contact with air exposed electrode layer contact areas of the LCL electro-optic device 11 as described hereinabove. Multiple layers of electro-optic wafers can be assembled without employing back-fill material, at least some support substrates having thereon various patterned electrodes 5, 6 extending to one side of die. FIG. 10B illustrates a top view of an electrode layer configuration and of a housing having a corresponding lead 16 configuration.

A manufacturing process in accordance with the proposed solution, includes holding, for example on a vacuum table, polarization dependent electro-optic device wafers for example having glass substrates, and using a mechanical scribe having a diamond tip for example as illustrated in FIG. 5B to scribe one of the substrates. The scribe process illustrated in FIGS. 11A and 11B scores (15) corresponding substrates 2 of each polarization dependent electro-optic device 11 while the mechanical integrity of each layered structure is maintained. The substrates 2 of each polarization dependent electro-optic device 11 can be scribed in similar fashion.

Figure 11A:
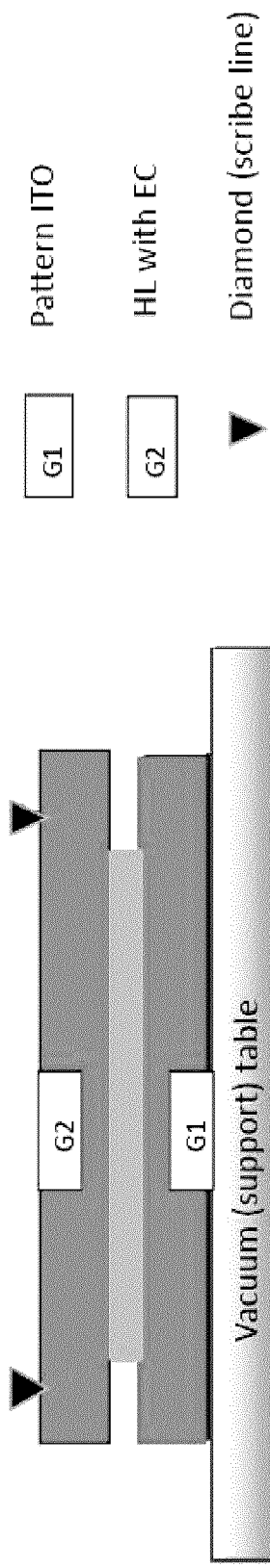
FIGS. 11A and 11B are schematic diagrams illustrating scribe processes providing inner scribe lines on corresponding wafers of polarization dependent electro-optic devices according to the proposed solution.
Figure 11B:
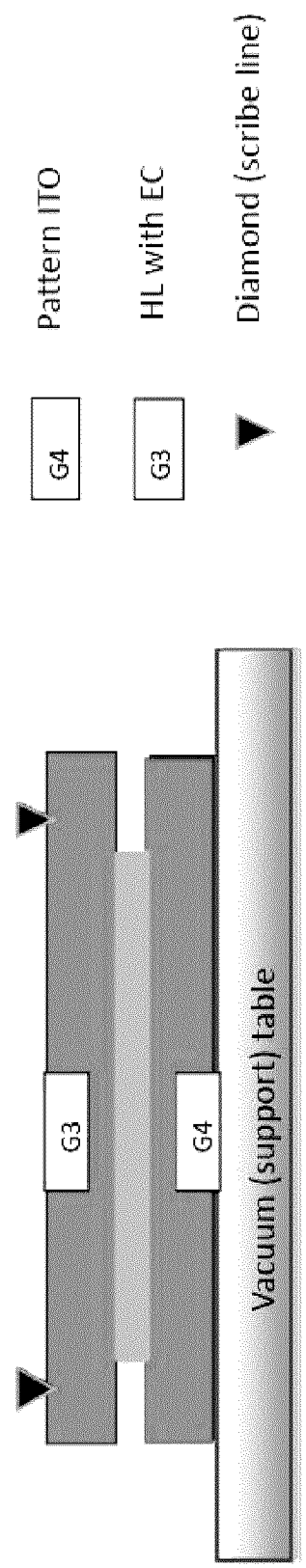
Figure 11C:
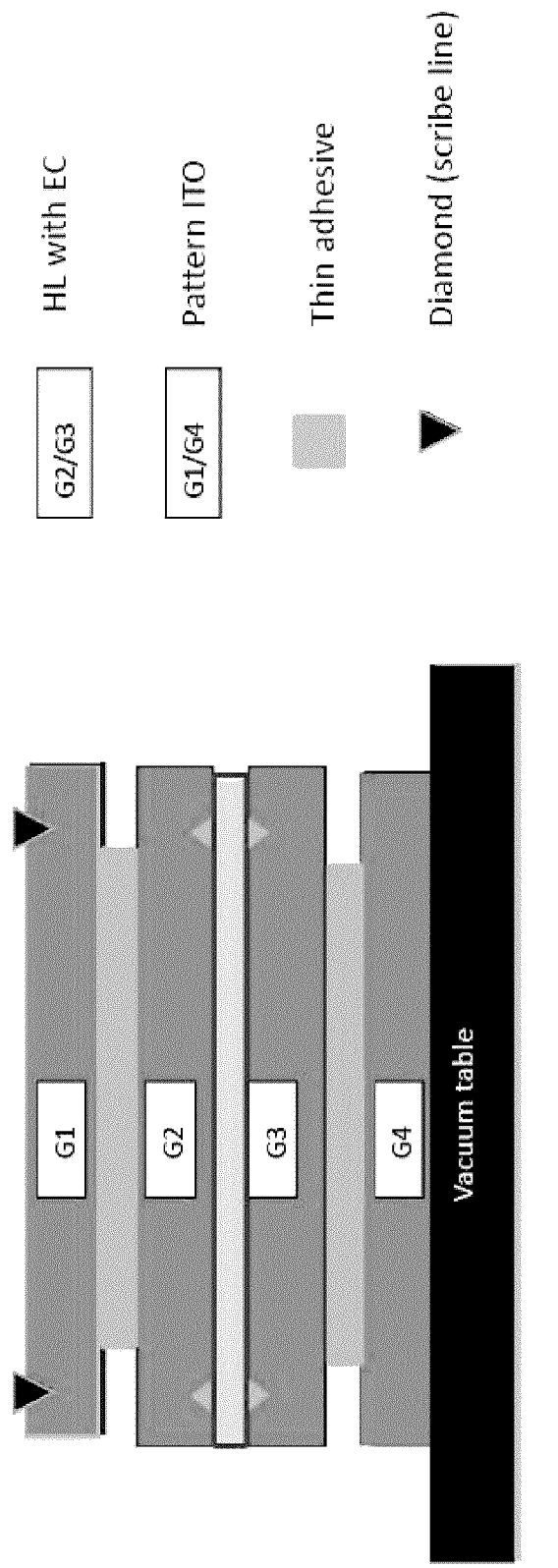
FIG. 11C is a schematic diagram illustrating a scribe process providing first external scribe lines on a wafer of polarization independent electro-optic devices according to the proposed solution.

Next, FIG. 11C illustrates an assembled polarization independent electro-optic device array (12) during fabrication, where the wafer 12 illustrated in FIG. 11A is assembled on top of the wafer 12 illustrated in FIG. 11B using a thin layer of transparent adhesive 19. Without limiting the invention, the previously made scribe lines 15 can be aligned and these scribe lines 15 are hereafter referred to internal scribe lines 15. Another scribe process (20) can be applied after this assembly process as illustrated in FIG. 11C to provide first external scribe lines 20. Without limiting the invention, the first external scribe lines 20 can be aligned with the internal scribe lines 15.

Figure 11D:
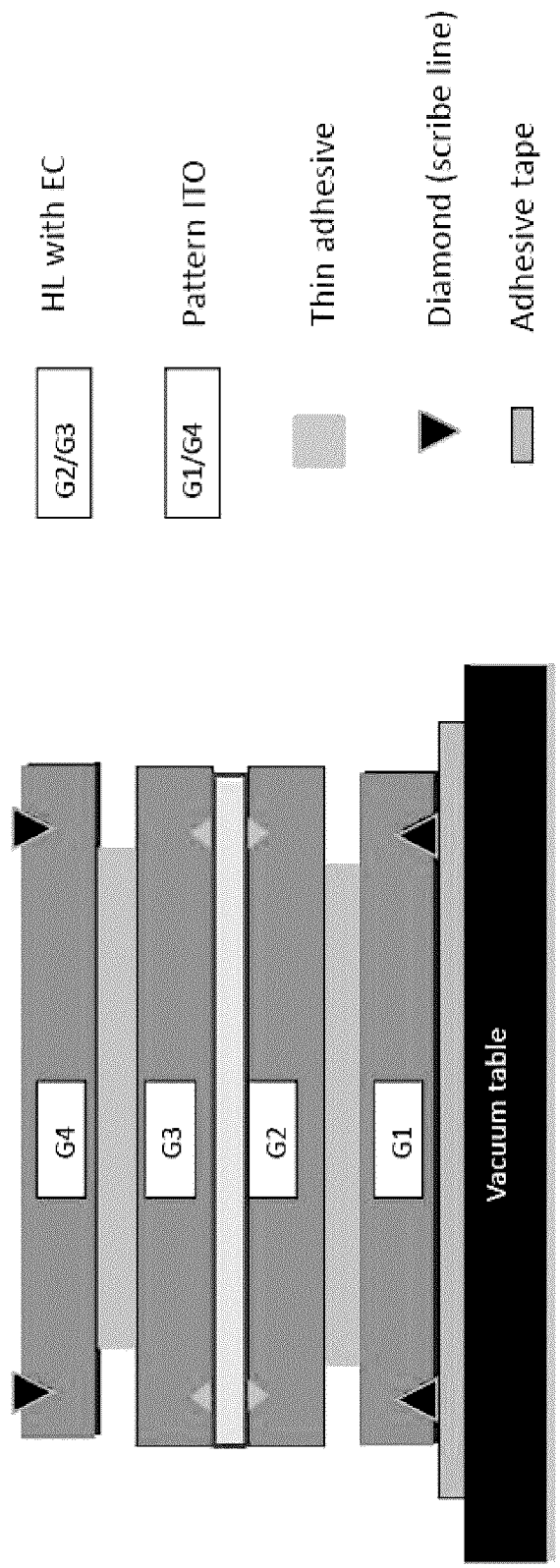
FIG. 11D is a schematic diagram illustrating a scribe process providing second external scribe lines on the wafer of polarization independent electro-optic devices of FIG. 11C according to the proposed solution.

Another final scribe process (20) can be applied to the opposed side of the polarization independent electro-optic device layered structure, as illustrated in FIG. 11D to provide second external scribe lines 20. For example, the layered wafer structure illustrated in FIG. 11C can be lifted using an adhesive tape and flipped. Without limiting the invention the second external scribe lines 20 can be aligned with the internal scribe lines 15 or with the first external scribe lines 20.

The electrical connection of such a die 11 can be achieved if external electrodes or conductive (polymerizable) adhesive are inserted between the substrates 1&2 or 3&4.

Figure 12A:
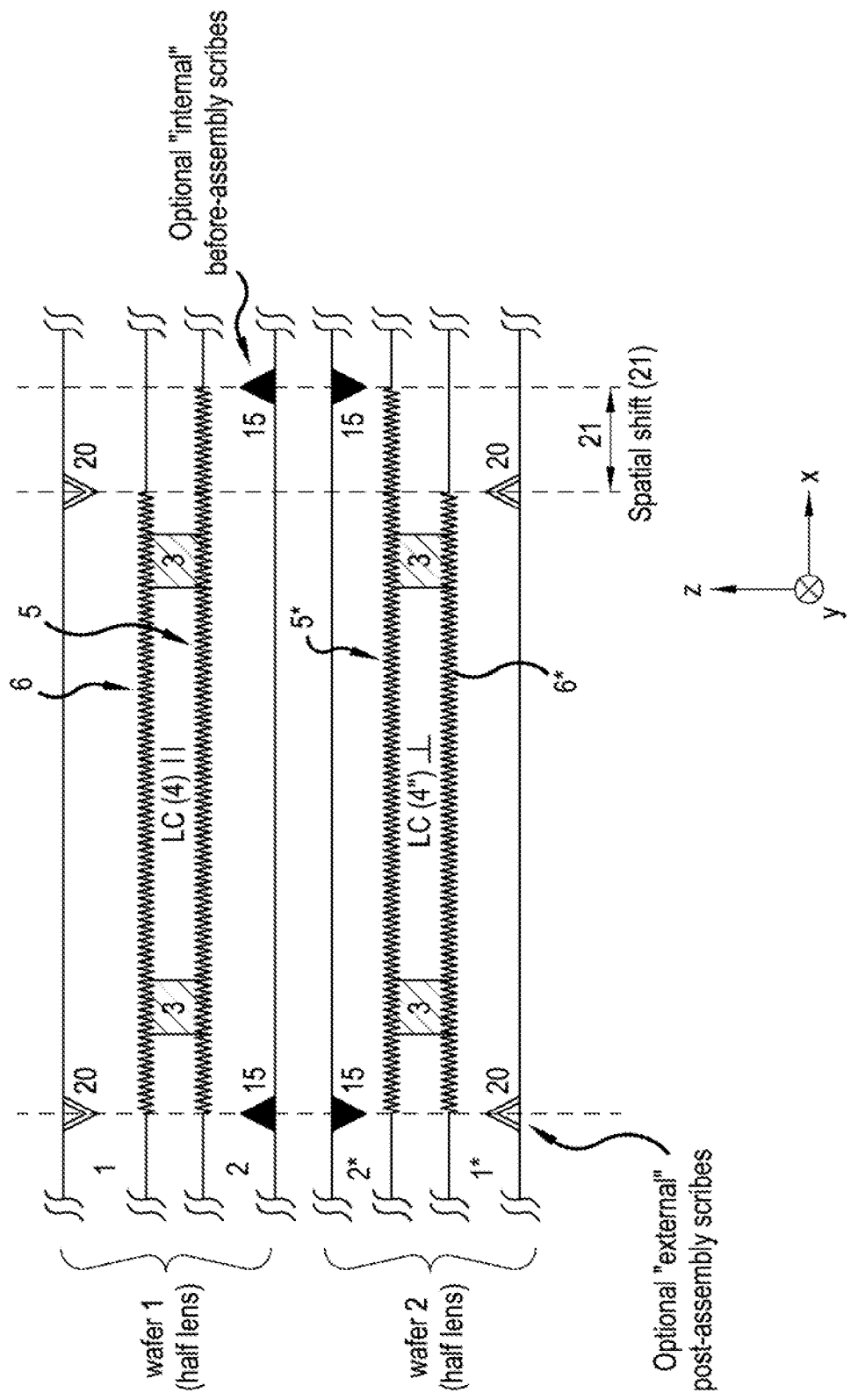
FIG. 12A is a schematic diagram illustrating a polarization independent electro-optic device layered structure having shifted scribe lines in accordance with the proposed solution.
Figure 12C:
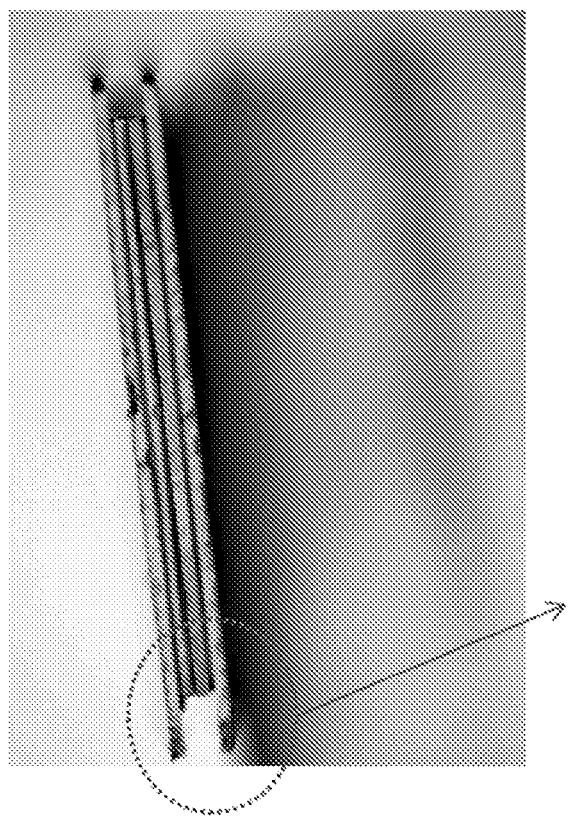
FIGS. 12B and 12C are illustrations showing singulated polarization independent electro-optic device layered structures respectively having outside and inside shifted scribe lines in accordance with the proposed solution.
Figure 12B:
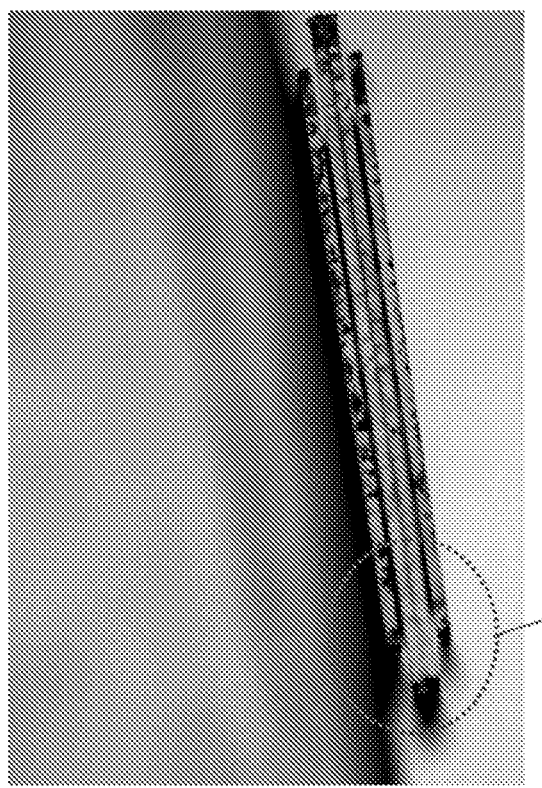

For certainty, the invention is not limited to vertically aligned scribe lines 15/20. In accordance with another implementation, the external scribe lines 20 can be laterally shifted 21 with respect to the internal scribe lines 15 as schematically illustrated in FIG. 12A. Depending upon the relative positions of external 20 and internal 15 scribe lines, the cleaved die 11 can have different electrode layer areas exposed to air. For example, laterally shifted scribed lines 15/20 can be employed independently in each x, y electro-optic device array direction. FIG. 12B illustrates a singulated polarization independent electro-optic device die 11 corresponding to FIG. 12A for example having a 150 µm lateral shift between the scribe lines 15/20. FIG. 12C illustrates a singulated polarization independent electro-optic device die 11 for example having a 150 µm lateral shift between the scribe lines 15/20 which would enable connection of stacked electrode 6 exposed areas with a common lead 16 expanded between the top and bottom substrates 1.

While fast singulation of high quality electro-optic devices from a wafer is possible using the mechanical scribe and cleave process described above, the cleaved substrate edges are not equal. For example, with reference to FIGS. 9C and 9B the substrate edge offsets for aligned scribe lines can be in the range of ±40 µm.

For certainty, the invention is not limited to employing grids of scribe lines, both internal 15 and external 20 scribes can also be circular, providing dies 11 of circular form.

In accordance with another embodiment of the proposed solution, improved results can be obtained by employing laser cutting techniques. With reference to FIG. 13A a laser cut technique includes focusing a laser beam to score dicing lines on a wafer 12. FIG. 13A illustrates laser scoring of a wafer 12 of polarization dependent LCL electro-optic devices 11 for cutting the individual dies of LCL out of the wafer 12. FIG. 13B illustrates individual polarization dependent electro-optic device dies 11 obtained after cleaving along the laser scored lines. Without limiting the invention, cleaving can include exposing the laser scored wafer array to thermal or acoustic shock. The laser cut process can involve a bulk (glass) substrate damage (or scribe), followed by a cleave or a direct cut by local melting or evaporation or other type of damage of the substrate.

Figure 14A:
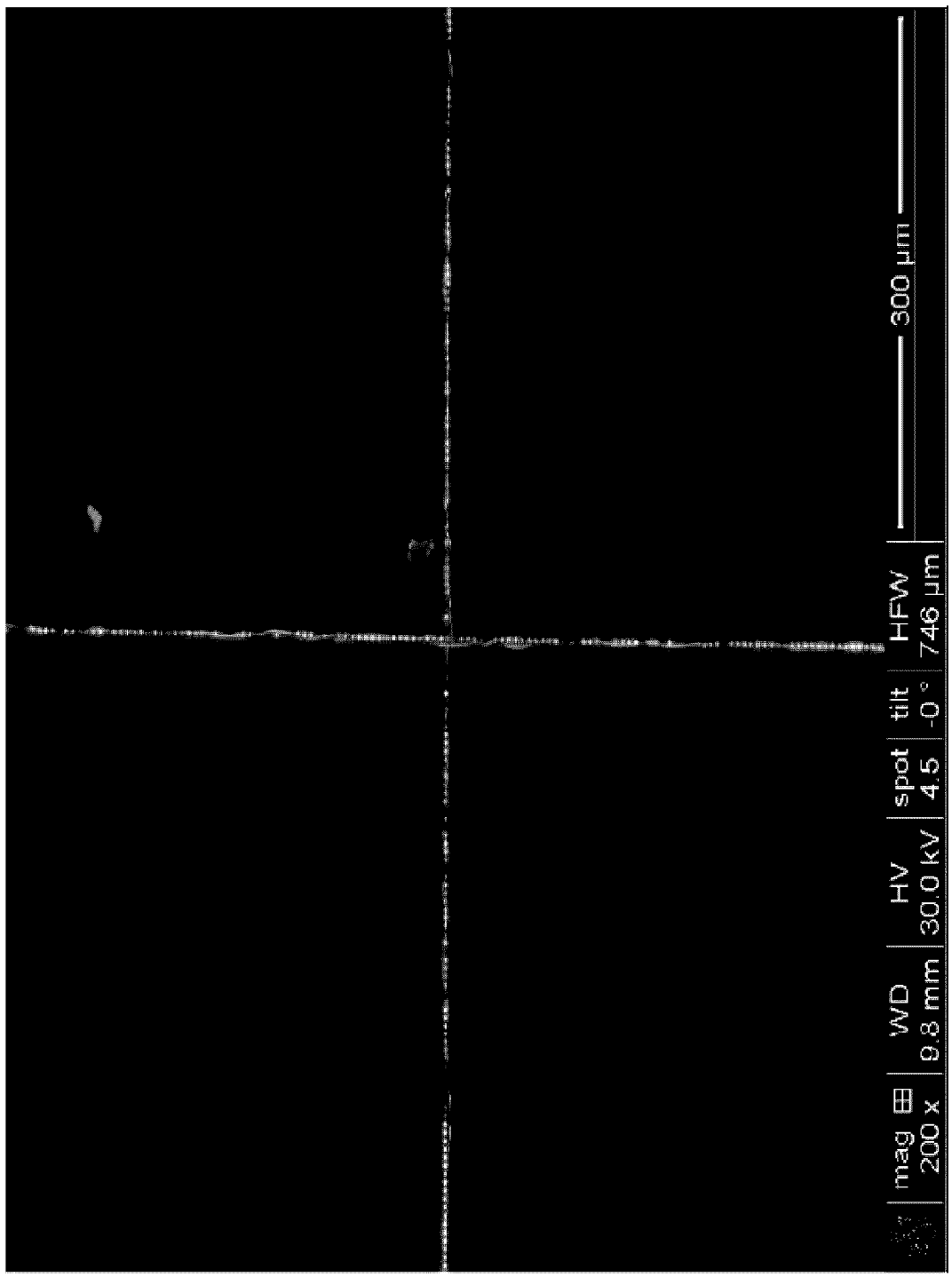
FIG. 14A is a SEM micrograph showing top view of a laser scribed wafer array of electro-optic devices in accordance with the proposed solution.
Figure 14B:
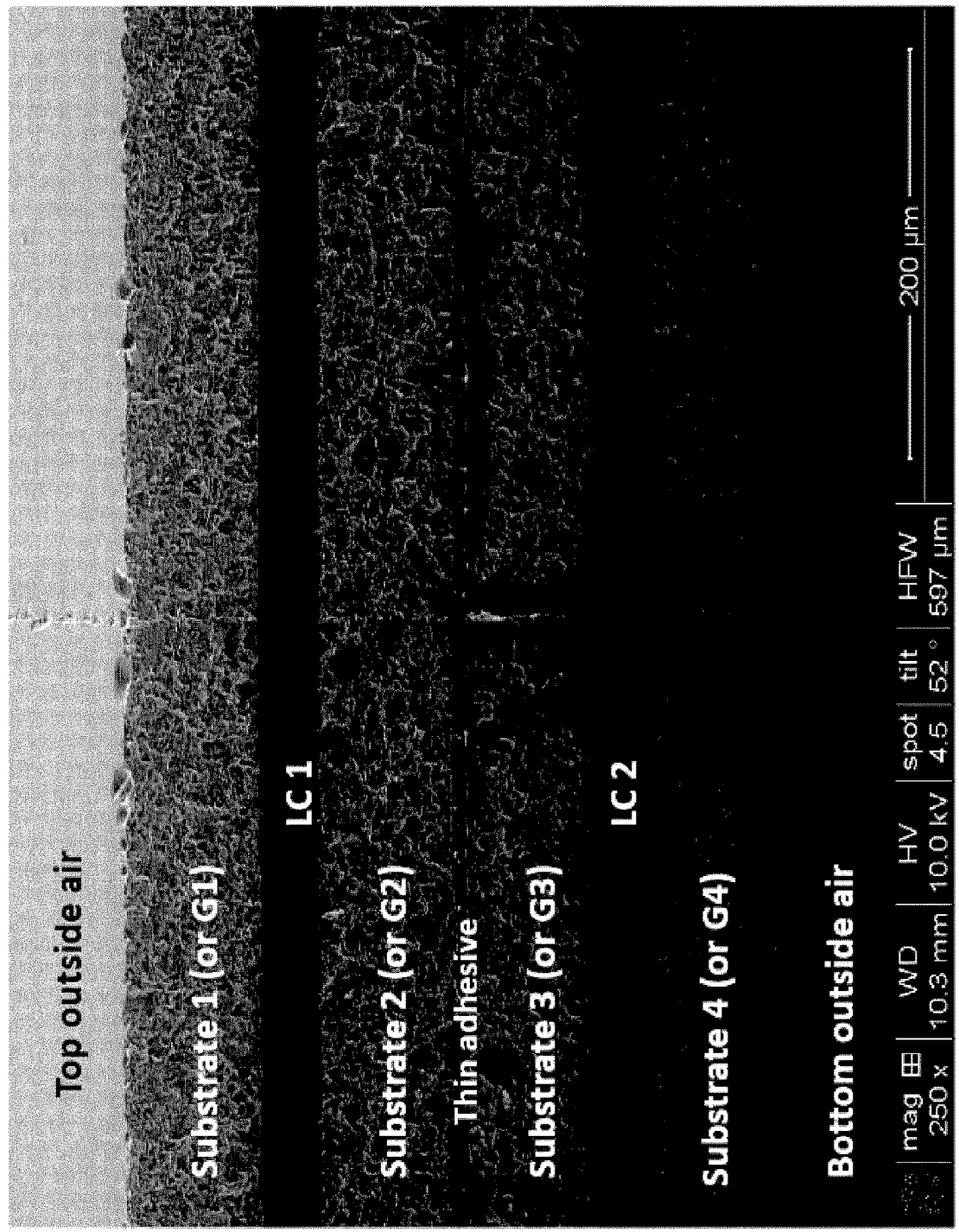
FIG. 14B is a SEM micrograph showing a front perspective view of a laser scribed wafer array of electro-optic devices in accordance with the proposed solution.
Figure 14C:
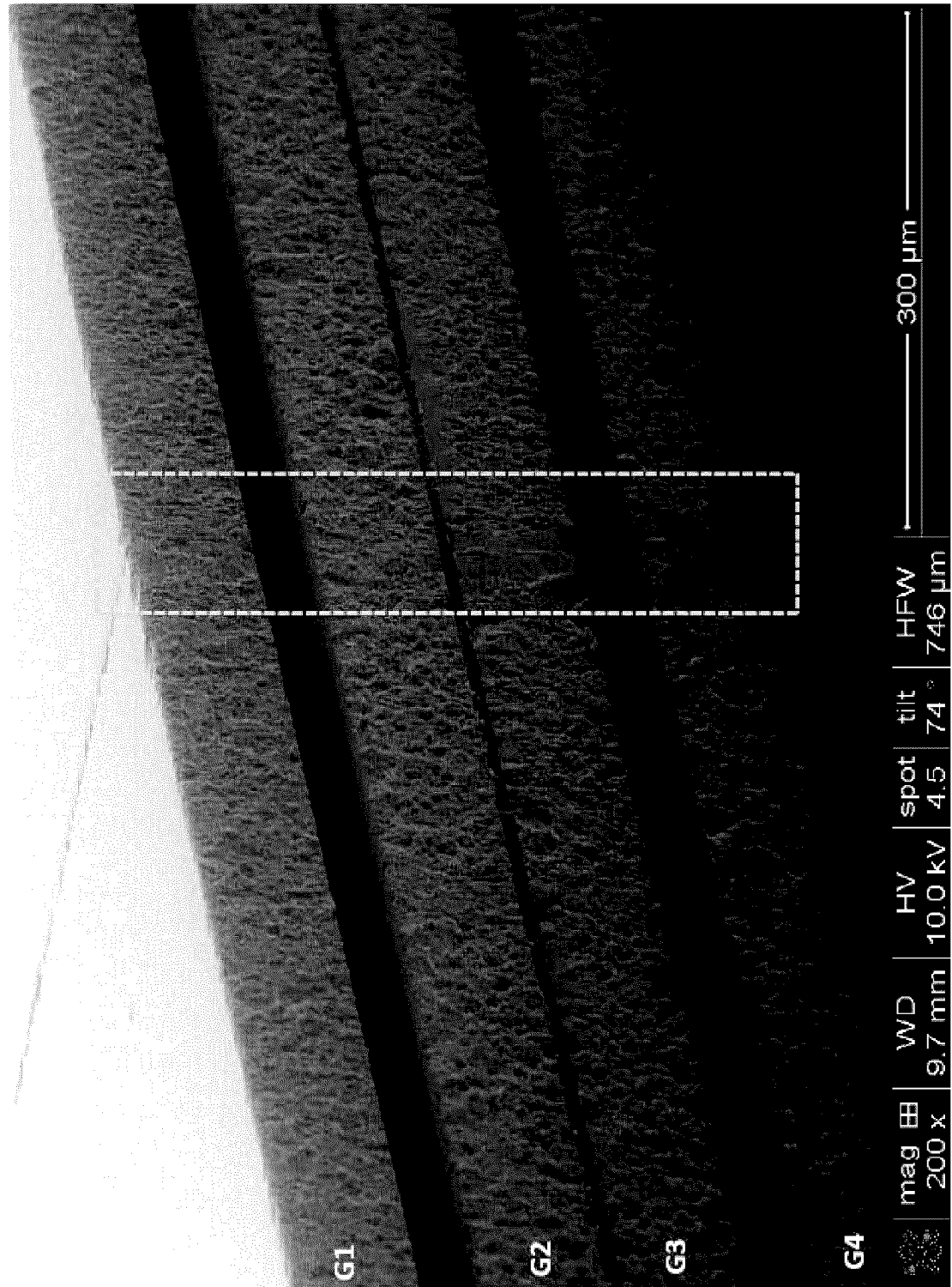
FIG. 14C is a SEM micrograph showing a side perspective view of a laser scribed wafer array of electro-optic devices in accordance with the proposed solution.

FIGS. 14A, 14B and 14C respectively illustrate top, side and perspective scanning electron microscope micrographs of an example of a symmetric cut of an array of polarization independent electro-optic devices 11 providing horizontally exposed electrode areas enabling electrical connectivity by external electrodes' insertion as illustrated in FIGS. 10A and 10B.

Figure 15A:
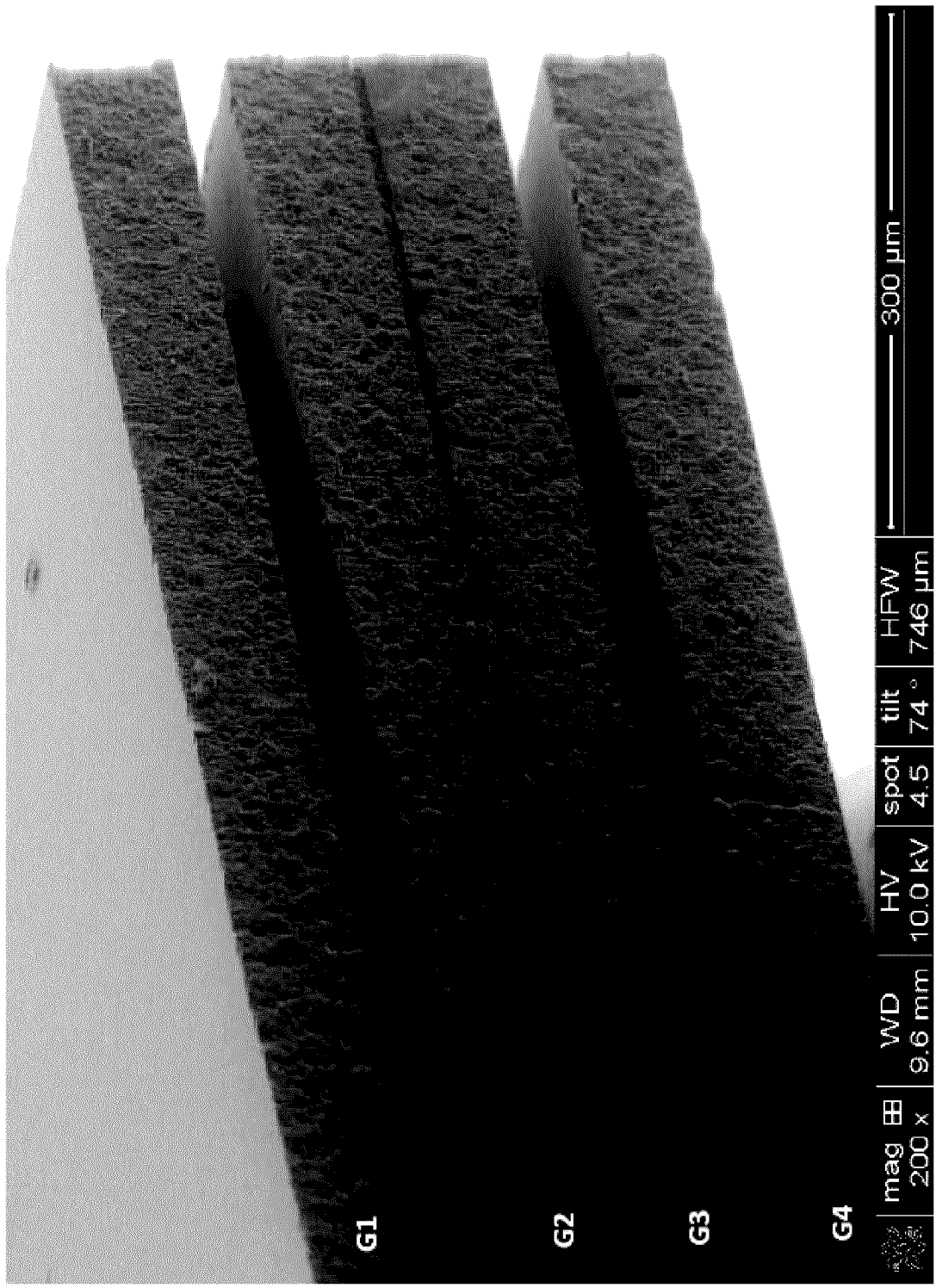
FIGS. 15A and 15B are SEM micrographs showing corner regions of a laser cut electro-optic device die in accordance with the proposed solution, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.
Figure 15B:
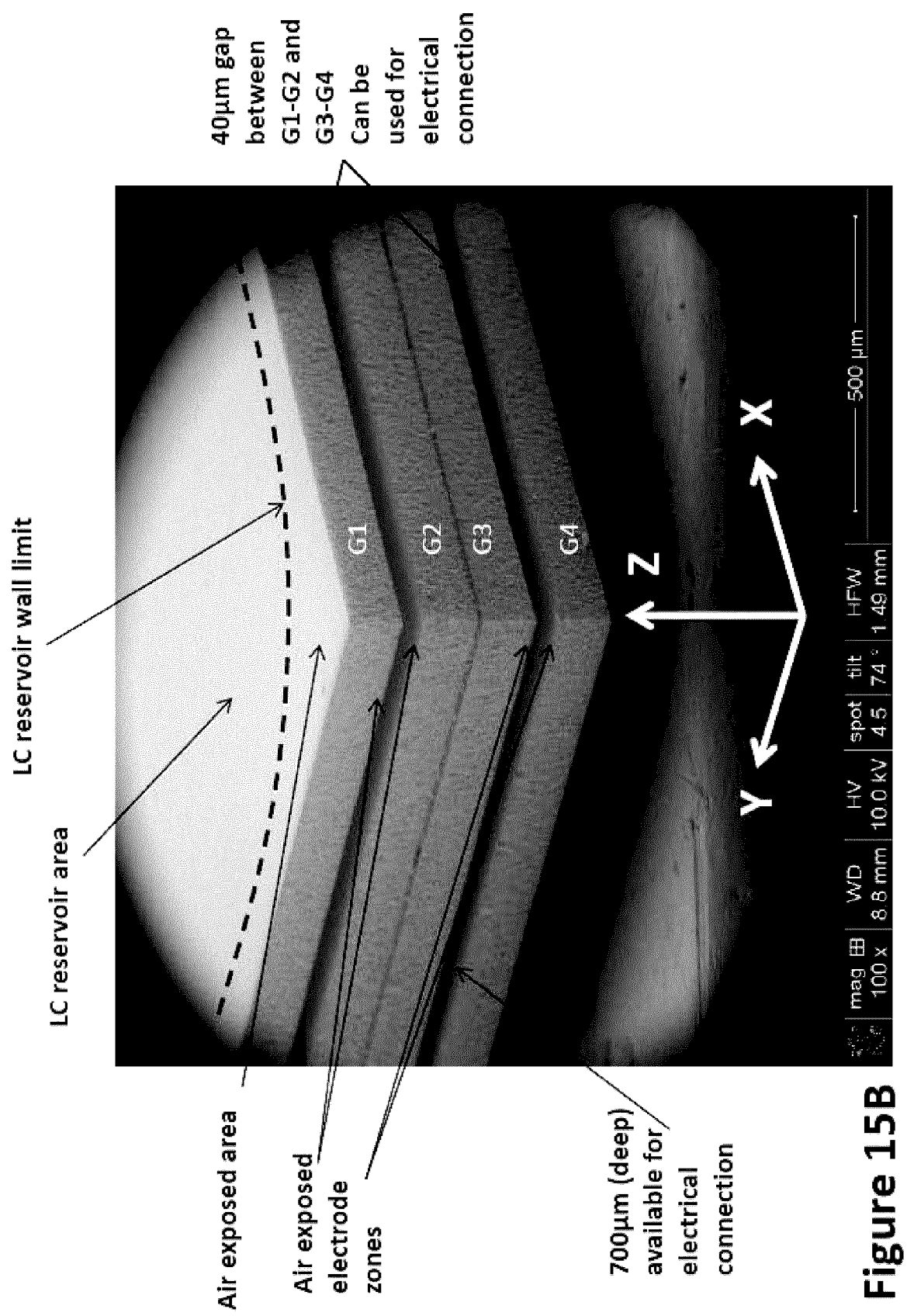

Dice edge comparison between mechanical dicing and laser dicing can be appreciated by observing FIGS. 9B and 15A, while dice edge comparisons can be appreciated by observing FIGS. 9C and 15B for the same layered geometry. No appreciable damage to the surface of the substrates nor to the thin layer of adhesive is observed. As it can be seen, it is clear that the laser cutting technique, allows obtaining air exposed electrode areas, which are still in the x-y plane while their cross section in the x-z or y-z planes is very small. The electrical connection of such a die 11 can be achieved if external electrodes or conductive (polymerizable) adhesive are inserted between the substrates 1&2 or 3&4, which have separations typically defined by the LC thickness (typically between 25 µm to 50 µm).

While the above described laser cutting technique does not provide for vertical electrode surface exposure for example illustrated in FIGS. 12A, 12B and 12C, the laser cutting technique provides fast singulation with high quality kerf and low edge roughness in comparison with mechanical dicing techniques.

With respect to LCL electro-optic devices, the layered geometries schematically illustrated in FIGS. 2B, 3A, 3B, 3C, 4, 5A, 5C, 9 and 12A are simplified by omitting additional layers. A person of skill in the art, would understand that the LC layer orientation of LC layers for example illustrated in FIGS. 9 and 12A is defined by corresponding alignment layers 30 sandwiching each LC layer. An alignment orientation can imparted to each alignment layer 30 during wafer level manufacture.

While extensive reference has been made in the above description to LC lens optical device, the invention is not limited thereto, for example the above can equally be applied to electro-optical device providing spatially variable control of light including shutters, mirrors and beam steering devices.

While the invention has been illustrated and described with referenced to preferred embodiments thereof, it will be recognized by those skilled in the art that various changes in form and detail may be made therein without departing from the spirit and scope of the invention as defined by the appended claims

What is claimed is:

1. A plurality of electro-optic devices comprising a plurality of connected liquid crystal cells for providing spatially variable control of light, the plurality of liquid crystal cells being arranged in an array, each liquid crystal cell comprising:
   a pair of opposed substrates, wherein the pair of opposed substrates are continuous and are common to the plurality of liquid crystal cells;
   a pair of electrodes for applying an electric field therebetween, each electrode deposited on one of the substrates;
   a pair of alignment layers disposed on the substrates;
   a liquid crystal reservoir wall; and
   a liquid crystal layer disposed between the pair of alignment layers and within the liquid crystal reservoir wall, such that the liquid crystal reservoir wall defines a lateral extent of the liquid crystal layer and the alignment layers define a predominant orientation direction for liquid crystal molecules of said liquid crystal layer,
   wherein each of the pair of electrodes extends from an inner side of the liquid crystal reservoir wall to an outer side of the liquid crystal reservoir wall,
   wherein at least one air-filled gap extends from the liquid crystal reservoir wall of a first one of the plurality of electro-optic devices to the liquid crystal reservoir wall of at least one other of the plurality of electro-optic devices and the pair of opposed substrates extend fully over the at least one air-filled gap and continuously over the plurality of liquid crystal cells,
   wherein each of the pair of electrodes comprises an air-exposed electrical contact area located in the at least one air-filled gap, and
   wherein each electrical contact area extends to a same side of said substrates.

2. One of the plurality of electro-optic devices as claimed in claim 1, wherein the at least one device comprises a plurality of singulatable devices on a wafer.

3. One of the plurality of electro-optic devices as claimed in claim 1, wherein said pair of alignment layers has one of same or opposing alignment directions.

4. One of the plurality of electro-optic devices as claimed in claim 1, wherein each liquid crystal reservoir wall is closed over an alignment layer having a perimeter configured to leave said electrical contact areas outside of said liquid crystal reservoir exposed to air.

5. One of the plurality of electro-optic devices as claimed in claim 1, wherein a first of the pair of electrodes is deposited on a first of the opposed substrates and a second of the pair of electrodes is deposited on a second of the opposed substrates.

6. One of the plurality of electro-optic devices as claimed in Claim 1, wherein at least one of the electro-optic devices is polarization dependent.

7. The plurality of electro-optic devices of claim 1, wherein a scribe pattern is formed on at least one of the pair of opposed substrates.

8. The plurality of electro-optic devices of claim 1, wherein a scribe pattern is formed on a first of the pair of opposed substrates and a matching scribe pattern is formed on the second of the pair of opposed substrates.

9. The plurality of electro-optic devices of claim 1, wherein external scribe lines and internal scribe lines are formed on at least one of the pair of opposed substrates.

10. In combination, one of a plurality of electro-optic devices comprising a plurality of connected liquid crystal cells for providing spatially variable control of light, the plurality of liquid crystal cells being arranged in an array, each liquid crystal cell comprising:
   a pair of opposed substrates, wherein the pair of opposed substrates are continuous and are common to the plurality of liquid crystal cells;
   a pair of electrodes for applying an electric field therebetween, each electrode deposited on one of the substrates;
   a pair of alignment layers disposed on the substrates;
   a liquid crystal reservoir wall; and
   a liquid crystal layer disposed between the pair of alignment layers and within the liquid crystal reservoir wall, such that the liquid crystal reservoir wall defines a lateral extent of the liquid crystal layer and the alignment layers define a predominant orientation direction for liquid crystal molecules of said liquid crystal layer,
   wherein each of the pair of electrodes extends from an inner side of the liquid crystal reservoir wall to an outer side of the liquid crystal reservoir wall,
   wherein at least one air-filled gap extends from the liquid crystal reservoir wall of a first one of the plurality of electro-optic devices to the liquid crystal reservoir wall of at least one other of the plurality of electro-optic devices and the pair of opposed substrates extend fully over the at least one air-filled gap and continuously over the plurality of liquid crystal cells, and
   wherein each of the pair of electrodes comprises an air-exposed electrical contact area located in the at least one air-filled qap,
   and
   at least one lead frame comprising an insertion guide for receiving at least one side of the electro-optic device and at least one contact member inserted into said gap and making electrical contact with one of said pair of electrodes of each liquid crystal cell,
   wherein said at least one lead frame comprises two said lead frames for receiving opposed sides of the electro-optic device.

11. In combination, an electro-optic device having a liquid crystal cell for providing spatially variable control of light and a lead frame,
   the electro-optic device comprising:
   a pair of opposed substrates, each substrate having a lateral extent;
   a pair of electrodes for applying an electric field therebetween, each electrode deposited on one of the substrates;
   a pair of alignment layers disposed on the substrates;
   a liquid crystal reservoir wall;
   a liquid crystal layer disposed between the pair of alignment layers and within the liquid crystal reservoir wall, such that the liquid crystal reservoir wall defines a lateral extent of the liquid crystal layer and the alignment layers define a predominant orientation direction for liquid crystal molecules of said liquid crystal layer, wherein each electrode of the pair of electrodes extends from an inner side of the liquid crystal reservoir wall to an outer side of the liquid crystal reservoir wall, wherein at least one air-filled gap extends over the outer side of the liquid crystal reservoir wall and the pair of opposed substrates extend fully over the at least one air-filled gap, wherein each electrode of the pair of electrodes comprises an air-exposed electrical contact area located in the at least one air-filled gap over a section of the opposed substrate devoid of the opposed electrode air-exposed electrical contact; and the lead frame comprising:
an insertion guide for receiving a bottom of said pair of opposed substrates and at least one contact member inserted into said at least one air-filled gap and making electrical contact with one electrode of said pair of electrodes.

12. The combination as defined in claim 11, wherein said contact member comprises one or more resilient metal strips with curled ends to be biased against said one of said pair of electrodes.

13. The combination as defined in claim 11, wherein said lead frame forms part of a mounting for said electro-optic device.

14. The combination as defined in claim 11, wherein said lead frame provides four electrode connections.

15. The combination as defined in claim 11, wherein said contact member comprises conductive adhesive.

16. The combination as defined in claim 11, wherein each electrical contact area extends to the same side of said substrates.

17. The combination as defined in claim 11, wherein said substrates have the same lateral extent.

18. The combination as defined in claim 11, wherein said substrates have different lateral extent.

19. The combination as defined in claim 11, wherein said reservoir wall comprises spacers defining a thickness of said liquid crystal reservoir.

* * * * *